(12) United States Patent
Hayhow et al.

(10) Patent No.: US 11,562,354 B2
(45) Date of Patent: Jan. 24, 2023

(54) TERMINAL CONFIGURATION SERVER FOR THE REMOTE CONFIGURATION OF TERMINALS

(71) Applicant: THE TORONTO-DOMINION BANK, Toronto (CA)

(72) Inventors: Robert Hayhow, Burlington (CA); Jeffrey Aaron Ecker, North York (CA); Igor Elkhinovich, Thornhill (CA); Keith Willard, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 409 days.

(21) Appl. No.: 16/895,495

(22) Filed: Jun. 8, 2020

(65) Prior Publication Data

US 2020/0302439 A1 Sep. 24, 2020

Related U.S. Application Data

(63) Continuation of application No. 14/721,755, filed on May 26, 2015, now Pat. No. 10,679,212.
(Continued)

(51) Int. Cl.
G06Q 20/38 (2012.01)
G06Q 20/40 (2012.01)
(Continued)

(52) U.S. Cl.
CPC ......... *G06Q 20/3829* (2013.01); *G06Q 20/20* (2013.01); *G06Q 20/326* (2020.05);
(Continued)

(58) Field of Classification Search
None
See application file for complete search history.

(56) References Cited

U.S. PATENT DOCUMENTS 5,336,870 A 8/1994 Hughes et al.
5,448,638 A 9/1995 Johnson et al.
(Continued)

FOREIGN PATENT DOCUMENTS

CN 103237005 8/2013
WO WO 200907041 6/2009

OTHER PUBLICATIONS

"The PCI ID Repository" (downloaded from http://pci-ids.ucw.cz/ and attached as PDF file; screen shot from Wayback Machine attached as PDF file for priority date evidence), (Year: 2013).*
(Continued)

*Primary Examiner* — James D Nigh
*Assistant Examiner* — Margaret M Neubig
(74) *Attorney, Agent, or Firm* — Duane Morris LLP

(57) ABSTRACT

A terminal configuration server is configured to save a manufacturer identifier in a terminal database, in association with a merchant identifier. The manufacturer identifier identifies a terminal. The terminal configuration server is configured to transmit the merchant identifier to a communications device via a communications network, and to receive from the communications device via the communications network, a terminal identifier request that includes the manufacturer identifier and the merchant identifier. The terminal configuration server is configured to verify that the manufacturer identifier, included in the terminal identifier request, is associated with the merchant identifier in the terminal database, and to download a payload to the terminal via the communications device after verifying the manufacturer identifier.

18 Claims, 10 Drawing Sheets

Related U.S. Application Data

(60) Provisional application No. 62/111,977, filed on Feb. 4, 2015, provisional application No. 62/002,962, filed on May 26, 2014.

(51) Int. Cl.
  G06Q 20/20 (2012.01)
  G06Q 20/32 (2012.01)

(52) U.S. Cl.
  CPC ........... G06Q 20/40 (2013.01); G06Q 20/401 (2013.01); G06Q 2220/00 (2013.01)

(56) References Cited

U.S. PATENT DOCUMENTS

| | | | |
|---|---|---|---|
| 6,877,093 B1 | 4/2005 | Desai | |
| 7,103,570 B1 | 9/2006 | Morea et al. | |
| 7,548,621 B1 | 6/2009 | Smith et al. | |
| 7,720,769 B1 | 5/2010 | Zajkowski et al. | |
| 7,783,572 B2 | 8/2010 | Fang et al. | |
| 7,905,400 B2 | 3/2011 | Stoutenburg et al. | |
| 8,058,188 B2 | 11/2011 | Salitsky et al. | |
| 8,190,798 B1 | 5/2012 | Dalal | |
| 8,259,694 B2 | 9/2012 | Walter et al. | |
| 8,321,924 B2 | 11/2012 | Lu | |
| 8,621,595 B2 | 12/2013 | Hayhow et al. | |
| 8,819,428 B2 | 8/2014 | Baig | |
| 8,898,799 B2 | 11/2014 | Johnson et al. | |
| 8,909,556 B2 | 12/2014 | Huxham | |
| 8,925,801 B2 | 1/2015 | Smith | |
| 8,972,721 B2 | 3/2015 | Neill et al. | |
| 9,009,786 B1* | 4/2015 | Bueche, Jr. ........... G06F 21/445 726/2 | |
| 2004/0030901 A1* | 2/2004 | Wheeler ................ H04L 9/3247 713/176 | |
| 2007/0005511 A1 | 1/2007 | Martinez | |
| 2007/0043682 A1 | 2/2007 | Drapkin et al. | |
| 2007/0234042 A1* | 10/2007 | Gantman ............ H04W 12/041 713/156 | |
| 2008/0049942 A1 | 2/2008 | Sprunk | |
| 2010/0299265 A1 | 11/2010 | Walters et al. | |
| 2010/0318468 A1 | 12/2010 | Carr et al. | |
| 2011/0010770 A1 | 1/2011 | Smith et al. | |
| 2011/0173678 A1 | 7/2011 | Kaippallimalil et al. | |
| 2012/0150750 A1 | 6/2012 | Law | |
| 2012/0159178 A1 | 6/2012 | Lin | |
| 2013/0198067 A1* | 8/2013 | Fasoli ................ G06Q 20/3567 705/41 | |
| 2014/0070000 A1 | 3/2014 | Dismukes et al. | |
| 2014/0108786 A1 | 4/2014 | Kreft | |
| 2014/0222688 A1 | 8/2014 | Haggerty | |
| 2014/0281493 A1 | 9/2014 | Nakhjiri | |
| 2014/0289130 A1 | 9/2014 | Savolainen et al. | |

OTHER PUBLICATIONS

ISO/IEC 9594-8: 1998(E), Disclosing structure & fields (including identifier) of certificate (downloaded) https://www.itu.int/rec/T-REC-X.509--200404-SICor6/en, p. 24, previously attached (year:1998).

NPL PCI ID Repository, downloaded from wayback Machine archive of http://pci-ids.ucw.cz/ and attached as PDF file (year:2011).

RFC 2315, "PKCS #7:Cryptographic message syntax," retrieved from https://tools.ietf.org/html.rfc2315 on Mar. 26, 2018, 32 pages.

Equinox Payments, "Remote key injection," downloaded from http://www.equinoxpayments.com/Media/Default/Library/Equinox%20RKI%20Data%20Sheet%20-%20Apollo_091214.pdf.

Payment Express, "Payment express EFTPOS getting started guide," downloaded on May 26, 2015 from https://www_paymentexpress.com/downloadsEFTPOSSetupGuide.pdf.

Skyzer Technologies, "Ingenico 5100 paymark version 6.0 contactless operating guide," downloaded on May 26, 2015 from http://www.skyzer.co.nz.LiteratureRetrieve.aspx?ID=103668.

Cybersecurity, "CD11 Certification Report NetMATRIX TLE Version 1.0 Build No. 00010003," Mar. 15, 2011, downloaded at http://www.cybersecurity.my.mycc/document/mycpr/C011/ISCB-S-RPT-C011-CR-v1a.pdf.

Brier et al., "A forward-secure symmetric key derivation protocol how to improve classical DUKPT," International Association for Cryptology Research, 2010, Lecture Notes in Computer Science vol. 6477, pp. 250-267.

\* cited by examiner

TERMINAL CONFIGURATION SERVER FOR THE REMOTE CONFIGURATION OF TERMINALS

RELATED APPLICATIONS

This patent application is a continuation of U.S. patent application Ser. No. 14/721,755, filed May 26, 2015 (now U.S. Pat. No. 10,679,212), which claims the benefit of the filing dates of U.S. Patent Application Ser. No. 62/002,962, filed May 26, 2014, and U.S. Patent Application Ser. No. 62/111,977, filed Feb. 4, 2015, the contents of all of which are incorporated herein by reference.

FIELD OF THE INVENTION

This patent application relates to a method and system for configuring terminals.

BACKGROUND

For a pin-pad terminal to be able to make a secure electronic payment via a merchant's acquirer, the pin-pad terminal must first be configured with a set of cryptographic keys that allows the pin-pad terminal to encrypt sensitive payment-related data transmitted from the pin-pad terminal to the acquirer via the merchant's acquirer network, and to decrypt sensitive payment-related data received at the pin-pad terminal.

To safeguard the cryptographic integrity of the pin-pad terminals, before the pin-pad manufacturer releases the pin-pad terminals to a merchant typically the manufacturer configures each virgin pin-pad terminal with a set of cryptographic keys by directly connecting the virgin pin-pad terminal to a hardware security module that generates the cryptographic keys and injects the keys directly into the pin-pad terminal. The hardware security module may also encrypt the cryptographic key sets, and transmit the encrypted key sets to a local computer for uploading to the merchant's acquirer. The pin-pad terminals are also typically stored in a secure restricted-access room for the duration of the configuration process.

While this approach to pin-pad configuration limits the likelihood of the security of the payment-related data from being compromised, this approach to pin-pad configuration is quite cumbersome and time consuming.

Fasoli (US 2013/0198067) describes using a personal communications device to remotely configure a standard EMV terminal. A merchant uses the personal communications device to provide a remote server with account information. In response, the remote server provides the personal communications device with a merchant identifier, a terminal identifier and a configuration file that includes information specific to a financial institution. The personal communications device then configures the standard EMV terminal with the merchant identifier, terminal identifier and configuration file. Baiq (U.S. Pat. No. 8,819,428) describes remotely injecting a public key into a PIN entry device that is already in use. The public key may be digitally-signed by a trusted authority to allow the PIN entry device to ensure that only a valid public key is injected into the PIN entry device. During a transaction with a merchant, the PIN entry device incorporates random data, time stamp data, device serial number and the consumer's PIN into a PIN block, and encrypts the PIN block with the public key prior to transmitting the PIN block to the acquirer. The acquirer may have the corresponding private key to validate the PIN block.

SUMMARY

This patent application discloses a terminal configuration system and method that remotely configures and authenticates terminals.

In accordance with a first aspect of the disclosure, there is provided a method of remotely authorizing a merchant for electronic payment, that involves a computer server receiving over a network from a communications device a merchant activation request that includes a device identifier and a cryptographically-signed datum.

The computer server verifies that the device identifier is uniquely associated with a pin-pad terminal, and confirms from the device identifier and the cryptographically-signed datum that a merchant operator is in possession of the pin-pad terminal. The computer server authorizes the merchant operator for electronic payment with the pin-pad terminal by associating a unique merchant identifier with the device identifier, and by providing to a financial institution the merchant identifier and merchant data received from the merchant operator.

In accordance with the first aspect of the disclosure, there is also provided a merchant authorization apparatus that includes a network interface and a merchant enrolment processor that is coupled to the network interface. The merchant enrolment processor is configured to receive over a network from a communications device a merchant activation request that includes a device identifier and a cryptographically-signed datum. The merchant enrolment processor is configured to verify that the device identifier is uniquely associated with a pin-pad terminal, and to confirm from the device identifier and the cryptographically-signed datum that a merchant operator is in possession of the pin-pad terminal.

The merchant enrolment processor is also configured to authorize the merchant operator for electronic payment with the pin-pad terminal by associating a unique merchant identifier with the device identifier and by providing to a financial institution the merchant identifier and merchant data received from the merchant operator.

In a preferred implementation, the merchant enrolment processor provides the communications device with the unique merchant identifier after validating the merchant data, and confirms that the merchant operator is in possession of the pin-pad terminal by confirming that the pin-pad terminal associated with the device identifier generated the cryptographically-signed datum from the unique merchant identifier.

Preferably, the pin-pad terminal generates an asymmetric cryptographic key pair (comprising a private cryptographic key and a public cryptographic key), and the merchant enrolment processor confirms that the merchant operator is in possession of the pin-pad terminal by using one cryptographic key of the cryptographic key pair to confirm that the pin-pad terminal generated the cryptographically-signed datum from the other cryptographic key of the cryptographic key pair.

In accordance with a second aspect of the disclosure, there is provided a method of configuring a pin-pad terminal over a network that involves a computer server receiving a merchant identifier over a network from a communications device associated with a pin-pad terminal. The computer server confirms from the merchant identifier that an entity associated with the communications device is authorized to use the pin-pad terminal.

The computer server authenticates the pin-pad terminal from a cryptographically-signed datum received from the communications device, and transmits to the pin-pad terminal via the communications device a configuration payload for installation in the pin-pad terminal. The configuration payload comprises at least a payment symmetric cryptographic key set uniquely associated with the pin-pad terminal. The payment symmetric key set configures the pin-pad terminal to effect secure electronic payment via the communications device.

In accordance with the second aspect of the disclosure, there is also provided a terminal configuration apparatus that includes a network interface and a pin-pad configuration processor that is coupled to the network interface. The pin-pad configuration processor is configured to receive a merchant identifier over a network from a communications device associated with a pin-pad terminal, and confirm from the merchant identifier that an entity associated with the communications device is authorized to use the pin-pad terminal.

The pin-pad configuration processor is configured to authenticate the pin-pad terminal from a cryptographically-signed datum received from the communications device, and to transmit to the pin-pad terminal via the communications device a configuration payload for installation in the pin-pad terminal. The configuration payload includes at least a payment symmetric cryptographic key set uniquely associated with the pin-pad terminal. The payment symmetric key set configures the pin-pad terminal to effect secure electronic payment via the communications device.

In a preferred implementation, the pin-pad configuration processor uniquely associates the pin-pad terminal with a terminal identifier, transmits the terminal identifier over the network to the communications device, and transmits the configuration payload to the pin-pad terminal after authenticating the pin-pad terminal from the terminal identifier and from the cryptographically-signed datum.

The pin-pad configuration processor may cryptographically-sign the terminal identifier, transmit the cryptographically-signed terminal identifier to the communications device, and transmit the configuration payload to the pin-pad terminal after receiving from the communications device over the network the cryptographically-signed datum confirming that the pin-pad terminal authenticated the terminal configuration apparatus from the cryptographically-signed terminal identifier.

Preferably, the pin-pad terminal generates an asymmetric key pair, generates the cryptographically-signed datum from the terminal identifier and one cryptographic key of the asymmetric key pair, and provides the terminal configuration apparatus with another cryptographic key of the asymmetric key pair prior to the terminal configuration apparatus receiving the merchant identifier. The pin-pad configuration processor may then authenticate the pin-pad terminal from the another cryptographic key of the asymmetric key pair.

Further, preferably the pin-pad terminal is uniquely associated with a manufacturer identifier prior to the terminal configuration apparatus receiving the merchant identifier, and the pin-pad configuration processor receives the manufacturer identifier and the merchant identifier from the communications device. The pin-pad configuration processor then confirms that the entity is authorized to use the pin-pad terminal by querying a database to determine that the manufacturer identifier is associated with the merchant identifier in the database.

BRIEF DESCRIPTION OF THE DRAWINGS

An exemplary pin-pad configuration system will now be described, with reference to the accompanying drawings, in which.

DETAILED DESCRIPTION

Pin-Pad Configuration System

Figure 1:
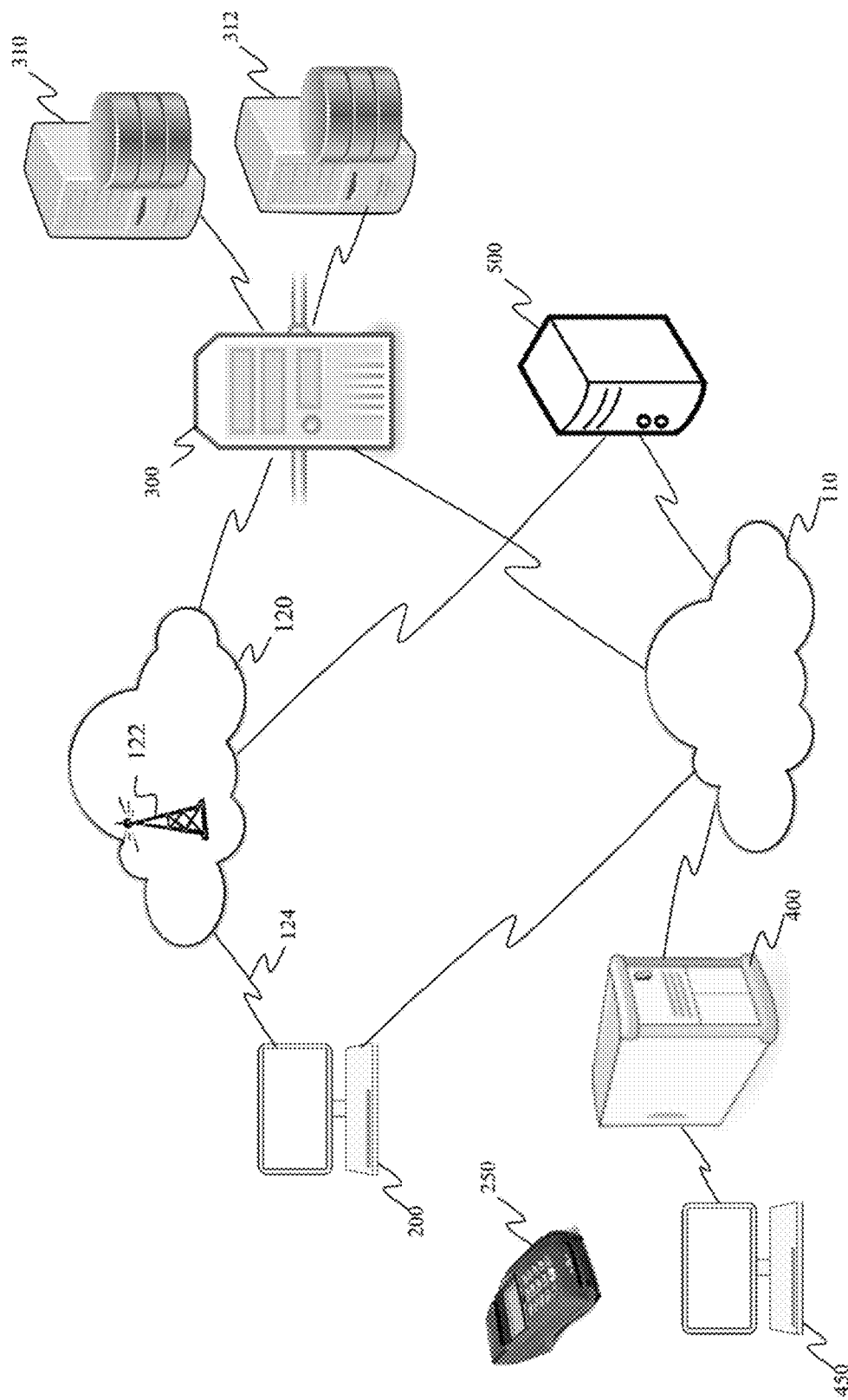
FIG. 1 is a schematic view of a pin-pad configuration system, depicting a communications device, a pin-pad terminal, a terminal activation server, a manufacturer server, a pin-pad configuration terminal and a financial institution server.

FIG. 1 is a schematic view of a pin-pad configuration system, denoted generally as 100. The pin-pad configuration system 100 comprises a communications device 200, a pin-pad terminal 250, a terminal activation server 300, a manufacturer server 400, a pin-pad configuration terminal 450 and a financial institution server 500. Although the pin-pad configuration system 100 is shown comprising only a single communications device 200, a single pin-pad terminal 250, a single manufacturer server 400 and a single pin-pad configuration terminal 450, the pin-pad configuration system 100 typically includes a plurality of the communications device 200, a plurality of the pin-pad terminals 250, a plurality of the manufacturer servers 400 and a plurality of the pin-pad configuration terminals 450.

The communications devices 200 may be implemented as a personal computer, an electronic cash register (ECR), a tablet computer, a smartphone or a personal digital assistant (PDA). One or more of the communications devices 200 may be configured for wireline communications over a wide area network 110, such as the Internet.

Preferably, one or more of the communications devices 200 is configured for wireless communications. Accordingly, preferably the pin-pad configuration system 100 also includes a mobile communications network 120. The mobile communications network 120 may be configured as a WiFi network, a cellular network, or a combination thereof.

The mobile communications network 120 comprises a plurality of wireless base station subsystems 122. The (wireless) communications devices 200 may communicate with the base station subsystems 122 via wireless links 124, and the base station subsystems 122 communicate with the terminal activation server 300 via a wireline, wireless or optical link. Accordingly, the base station subsystems 122 act as a bridge between the wireless links 124 on the one hand, and the terminal activation server 300 and the financial institution servers 500 on the other hand.

As will be discussed below, the pin-pad terminals 250 typically include an input (keypad) device, a display device, and a payment card interface/reader, and are used to facilitate secure electronic payment transactions with the financial institution servers 500. However, in contrast to conventional pin-pad terminals 250, instead of directly connecting to the financial institution server 500 of the financial institution used by the merchant (merchant's financial institution server 500), the pin-pad terminals 250 indirectly connect to the merchant's financial institution server 500 via one of the communications devices 200.

The pin-pad terminals 250 may be configured to communicate with the communications devices 200 via a wired connection and/or via a wireless connection. Typically, the pin-pad terminals 250 and one of the communications device 200 are deployed at a merchant's business premises. When fabricated by a pin-pad manufacturer and initially received by the merchant, the pin-pad terminals 250 are "virgin" in the sense that they are configured with communications firmware that allows the pin-pad terminal 250 to process input data received from the keypad, display information on the display device, and communicate with one of the communications devices 200, but cannot authenticate to any of the financial institution servers 500.

The terminal activation server 300 may be implemented on one or more computers, and is configured to communicate with the communication devices 200 via the wide area network 110 and/or the mobile communications network 120. The terminal activation server 300 also maintains a database comprising a plurality of sets of unique payment symmetric cryptographic keys payKx, and a plurality of unique terminal identifiers TermID each associated with a respective set of the payment symmetric cryptographic keys payKx.

As will be discussed below, after a merchant purchases a virgin pin-pad terminal 250 from a pin-pad manufacturer, the terminal activation server 300 downloads and remotely configures the virgin pin-pad terminal 250 with one of the terminal identifiers TermID and the corresponding set of the payment symmetric cryptographic keys payKx, and downloads payment processing firmware to the virgin pin-pad terminal 250. The set of payment symmetric cryptographic keys payKx, together with the payment processing firmware, after being installed in a virgin pin-pad terminal 250, allows the pin-pad terminal 250 to perform secure electronic payment transactions with the financial institution server 500 of the merchant's acquirer, via the communications device 200 (including authenticating to the acquirer's financial institution server 500, and generating encrypted requests for authorization of said electronic payment transactions).

Each manufacturer server 400 is associated with a respective pin-pad manufacturer, and is configured to communicate with the terminal activation server 300 via the wide area network 110. The pin-pad manufacturer may also deploy one or more of the pin-pad configuration terminals 450 at the premises of the pin-pad manufacturer. The pin-pad configuration terminals 450 are configured to communicate with the associated manufacturer server 400 and with virgin pin-pad terminals 250 and allow the pin-pad manufacturer to install the communications firmware and a unique manufacturer identifier ManfID into each virgin pin-pad terminal 250.

The financial institution server 500 is associated with a financial institution. The financial institution server 500 maintains financial accounts for each of a plurality of merchants, and is configured to communicate with the merchant's pin-pad terminal(s) 250 via the wide area network 110, and/or the mobile communications network 120 (with the merchant's communications device 200 acting as communications intermediary between the pin-pad terminal(s) 250 and the financial institution server 400). After the merchant's pin-pad terminal 250 has been configured with a set of payment symmetric cryptographic keys payKx and the payment processing firmware, the financial institution server 500 can receive from the pin-pad terminal 250, via the wide area network 110 and the mobile communications network 120, encrypted requests for authorization of an electronic payment initiated at the pin-pad terminal 250. Accordingly, the wide area network 110 and the mobile communications network 120 are each "acquirer networks" that carry encrypted communications between the merchant's pin-pad terminal(s) 250 and the financial institution server 500 of the financial institution that maintains the merchant's financial account (merchant's "acquirer" server).

The financial institution server 500 is also configured to communicate with the terminal activation server 300 via the wide area network 110, and to communicate with other financial institution servers via a payment network (not shown), such as VisaNet®, the Mastercard® Network or the Interac® Network. The financial institutions server 500 is also configured to direct the authorization requests (received from the pin-pad terminals 250 via the acquirer network) to the appropriate financial institution, via the payment network, for authorization.

Although the terminal activation server 300, the manufacturer server 400 and the pin-pad configuration terminal 450 are shown in FIG. 1 as being separate entities, the functionality of the terminal activation server 300 and/or the pin-pad configuration terminal 450 may be incorporated into one or more of the manufacturer servers 400.

Communications Device

Figure 2:
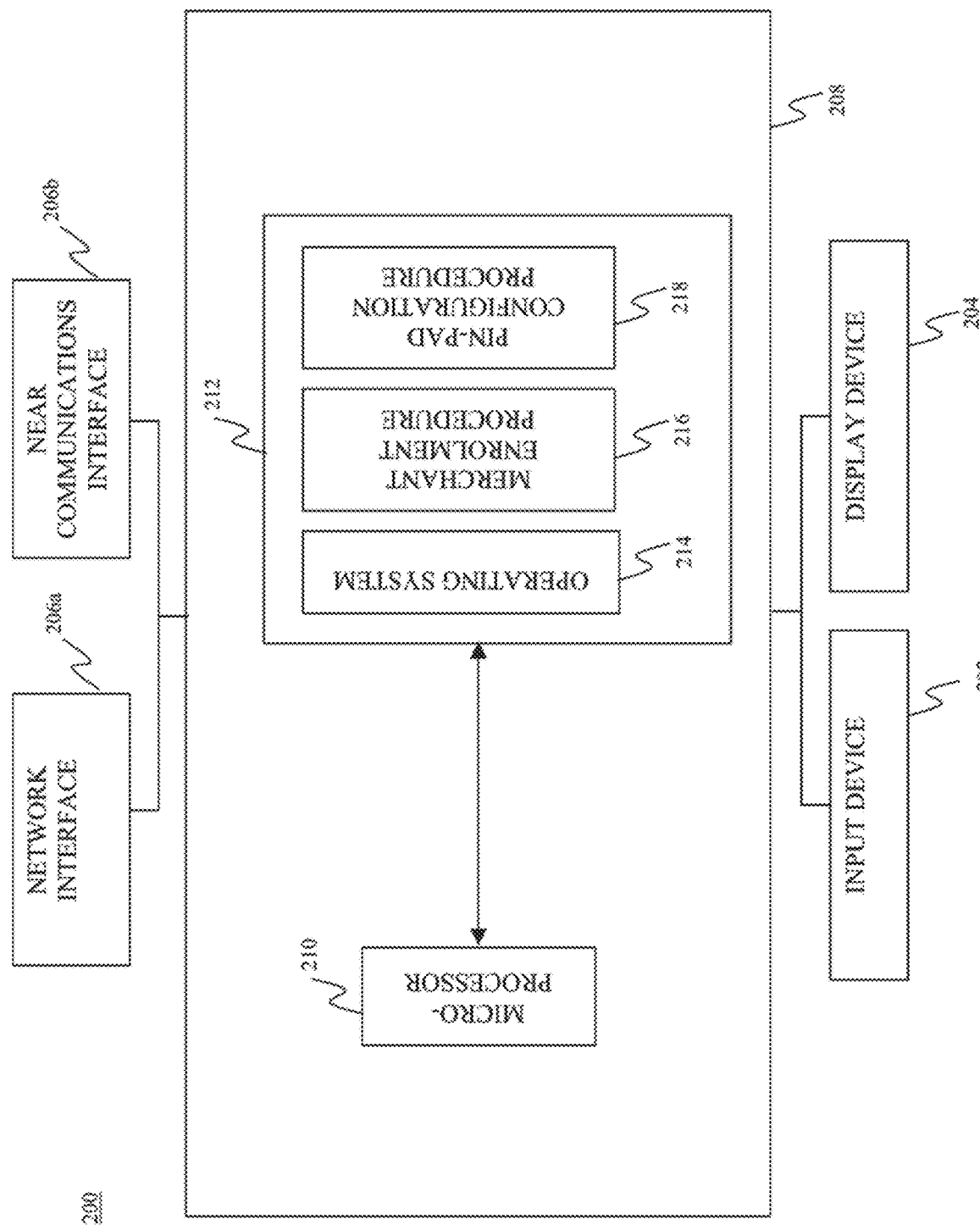
FIG. 2 is a schematic view of a communications device of the pin-pad configuration system.

As discussed, the communications device 200 may be implemented as a personal computer, an electronic cash register (ECR), a tablet computer, a smartphone or a personal digital assistant (PDA). The communications device 200 may be configured for wireline and/or wireless communications. Therefore, as shown in FIG. 2, the communications device 200 includes an input device 202, a display device 204, a network interface 206a, a near communications interface 206b, and a data processing system 208 that is coupled to the input device 202, the display device 204, the network interface 206a and the near communications interface 206b.

The network interface 206a interfaces the communications device 200 with the wide area network 110 and/or the mobile communications network 120. The near communications interface 206b may comprise a wired connection interface, such as a universal serial bus (USB) port, that allows the communications device 200 to communicate with a pin-pad terminal 250 via a wired connection. Alternately (or additionally), the near communications interface 206b may comprise an antenna that allows the communications device 200 to communicate with a pin-pad terminal 250 via a short-range wireless connection (e.g. short-Bluetooth and/or Near Field Communications (NFC)).

The data processing system 208 includes a microprocessor 210 and a non-transient computer-readable medium 212.

The non-transient computer-readable medium 212 may be provided as non-volatile electronic computer memory (e.g. flash memory) and stores computer processing instructions which, when executed by the microprocessor 210, implement an operating system 214, a merchant enrolment procedure 216 and a pin-pad configuration procedure 218.

The operating system 214 controls the overall operation of the communications device 200, and is typically installed on the communications device 200 by the device manufacturer prior to delivery to the end-user (merchant) and/or updated by the device manufacturer via software downloads to the communications device 200.

The merchant enrolment procedure 216 and the pin-pad configuration procedure 218 are typically installed on the communications device 200 by the end-user (merchant) via a software download to the communications device 200.

The merchant enrolment procedure 216 transmits over a network (the wide area network 110 and/or the mobile communications network 120) to the terminal activation server 300 merchant data associated with a merchant operator of the communications device 200, and receives a unique merchant identifier (e.g. MerchID) in response after the terminal activation server 300 validates the merchant data. The merchant enrolment procedure 216 also transmits over the network to the terminal activation server 300 a merchant activation request that is uniquely associated with a pin-pad terminal 250 and includes a cryptographically-signed datum (e.g. MPubK-signed MerchID) to allow the terminal activation server 300 to confirm from the merchant identifier and the cryptographically-signed datum that the merchant operator is in possession of the pin-pad terminal 250.

After the terminal activation server 300 confirm that the merchant operator is in possession of the pin-pad terminal 250, the terminal activation server 300 authorizes the merchant operator for electronic payment with the pin-pad terminal 250 by associating the merchant identifier with the merchant data and a device identifier (e.g. ManfID) uniquely associated with the pin-pad terminal 250 and by providing the merchant identifier and the associated merchant data to a financial institution associated with the merchant operator. The merchant enrolment processor 216 will be discussed in greater detail below.

The pin-pad configuration procedure 218 transmits a merchant identifier (MerchID) over a network (the wide area network 110 and/or the mobile communications network 120) to the terminal activation server 300. The pin-pad configuration procedure 218 also transmits a cryptographically-signed datum to the terminal activation server 300 after the pin-pad configuration procedure 218 authenticates the terminal activation server 300. After the terminal activation server 300 confirms from the merchant identifier that the entity (merchant) associated with the communications device 200 is authorized to use a particular pin-pad terminal 250, and authenticates the pin-pad terminal 250 from the cryptographically-signed datum, the pin-pad configuration procedure 218 receives from the terminal activation server 300 a configuration payload for installation in the pin-pad terminal 250. The configuration payload includes at least a payment symmetric cryptographic key set (payKx) that is uniquely associated with the pin-pad terminal 250.

As discussed above, the set of payment symmetric cryptographic keys payKx allows the pin-pad terminal 250 to perform secure electronic payment transactions with the financial institution server 500 of the merchant's acquirer (including authenticating to the acquirer's financial institution server 500, and generating encrypted requests for authorization of said electronic payment transactions). The pin-pad configuration procedure 218 will be discussed in greater detail below.

Pin-Pad Terminal

Figure 3:
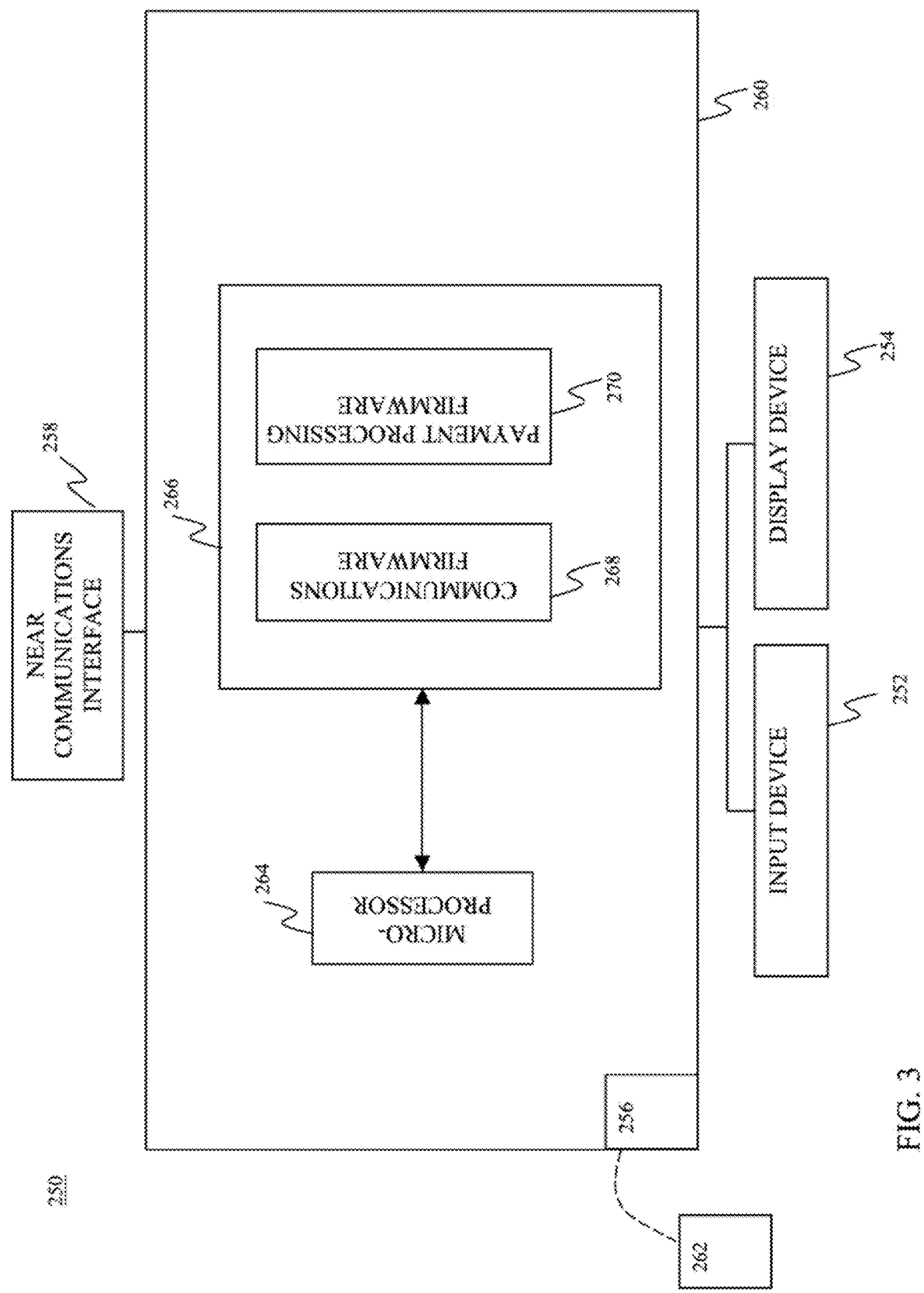
FIG. 3 is a schematic view of a terminal activation server of the pin-pad configuration system.

As shown in FIG. 3, each pin-pad terminal 250 includes an input (keypad) device 252, a display device 254, a payment card interface/reader 256, a near communications interface 258, and a data processing system 260 that is coupled to the input device 252, the display device 254, the payment card interface 256 and the near communications interface 258. The input device 252 may be implemented as a keyboard, touchpad, touchscreen or other input device suitable for allowing a user of the pint-pad terminal 250 to input data and/or commands that may be required to initiate/complete an electronic financial transaction. The display device 254 may be implemented as a liquid crystal display (LCD) panel, cathode ray tube (CRT) display, plasma display panel, or other display device suitable for displaying transaction information to the user.

The payment card interface 256 is configured to communicate with a payment card 262 (e.g. credit card, debit card). The payment card 262 may be implemented as a plastic card that has a contact form factor and/or a contactless (e.g. ISO 14443 based) form factor. If the payment card 262 has a contact form factor, the payment card interface 256 may comprise a physical port (e.g. smartcard reader) that allows the pin-pad terminal 250 to communicate directly with the payment card 262. If the payment card 262 has a contactless form factor, the payment card interface 256 may comprise a wireless interface that allows the pin-pad terminal 250 to communicate with the payment card 262 via a wireless protocol, such as ISO 14443.

The near communications interface 258 may comprise a wired connection interface, such as a universal serial bus (USB) port, that allows the pin-pad terminal 250 to communicate with the associated communications device 200 via a wired connection. Alternately, the data processing system 260 may implement one or more wireless short-range communications protocols, and the near communications interface 258 may comprise a Bluetooth and/or Near Field Communications (NFC) antenna that allows the pin-pad terminal 250 to communicate with the associated communications device 200 via a wireless connection.

The data processing system 260 may include one or more microprocessors 264 and a non-transient computer-readable medium 266. The non-transient computer-readable medium 266 may be provided as non-volatile protected electronic computer memory (e.g. secure flash memory). The protected memory 266, together with the microprocessor(s) 264, provide a secure memory store for identifiers, cryptographic keys and computer processing instructions, and a secure computing environment for the execution of the computer processing instructions.

As will be explained in further detail, after the "virgin" pin-pad terminal 250 is fabricated and configured by the pin-pad manufacturer, the protected memory 266 securely stores the unique identifier (ManfID) assigned to the pin-pad terminal 250 by the manufacturer, and the computer processing instructions comprise an operating system/communications firmware 268 that allows the pin-pad terminal 250 to process input data received from the input device 252, display information on the display device 254, communicate with the payment card interface 256, communicate with one of the communications devices 200 via the near communications interface 258, and to implement cryptographic (e.g. Data Encryption Standard (DES), triple-DES, Advanced Encryption Standard (AES)) algorithms. However, the communications firmware 268 does not allow the virgin pin-pad terminal 250 to authenticate to any of the financial institution servers 500.

After the virgin pin-pad terminal 250 has been released by the manufacturer and the terminal activation server 300 has remotely authorized the merchant, the protected memory 266 securely stores a merchant identifier (MerchID) that is uniquely associated with the merchant. After the terminal activation server 300 has completed remote configuration of the virgin pin-pad terminal 250, the protected memory 266 securely stores a unique terminal identifier (TermID) and a unique set of payment symmetric cryptographic keys (payKx), and the computer processing instructions comprise payment processing firmware 270 that allows the pin-pad terminal 250 to perform secure electronic payment transactions (contact (e.g. magnetic strip, EMV (chip/pin)), contactless (e.g. smartcard)) with the financial institution server 500 of the merchant's acquirer (including using the payment symmetric cryptographic keys (payKx) to authenticate to the acquirer's financial institution server 500, and to generate encrypted requests for authorization of said electronic payment transactions). The pin-pad configuration procedure 218 will be discussed in greater detail below.

Terminal Activation Server

Figure 4:
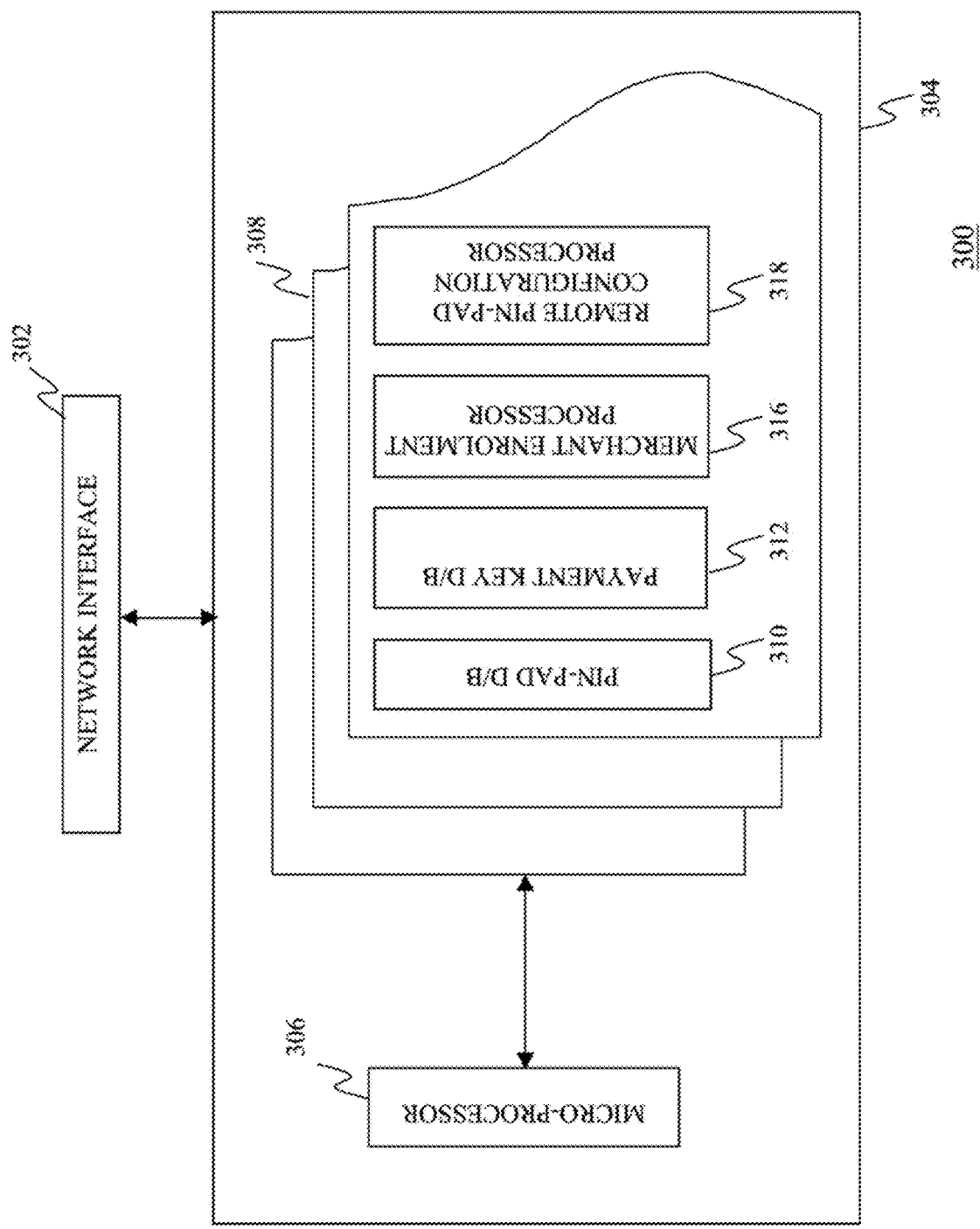
FIG. 4 is a schematic view of a manufacturer server of the pin-pad configuration system.

As shown in FIG. 4, the terminal activation server 300 includes a network interface 302, and a data processing system 304 that is coupled to the network interface 302. The network interface 302 interfaces the terminal activation server 300 with the wide area network 110 and/or the mobile communications network 120 to allow the terminal activation server 300 to communicate with the communications terminals 200. The network interface 302 also allows the terminal activation server 300 to communicate with the manufacturer server 400 and the financial institution server 500.

The data processing system 304 may include a microprocessor 306 and a non-transient computer-readable medium 308. The computer-readable medium 308 may be provided as non-volatile electronic computer memory (e.g. flash memory) or optical or magnetic memory (e.g. compact disc, hard disk) and maintains a pin-pad database 310 and a payment key database 312. Preferably, the computer-readable medium 308 also stores a copy of the payment processing firmware 270 that is to be remotely downloaded to and installed in the pin-pad terminals 250.

As will be explained below, the terminal activation server 300 maintains in the pin-pad database 310 a plurality of clusters, each including a unique manufacturer identifier ManfID, a unique manufacturer private cryptographic key MPrvK, a merchant identifier MerchID and optionally merchant data all associated with the respective manufacturer identifier ManfID.

The payment key database 312 includes a plurality of clusters, each including a unique terminal identifier TermID, and a unique set of payment symmetric cryptographic keys payKx that are associated with the respective terminal identifier TermID. As will be explained, the terminal activation server 300 also temporarily saves in at least one cluster of the payment key database 312 a unique set of random symmetric cryptographic keys randKx associated with a respective terminal identifier TermID.

Instead of maintaining the contents of the pin-pad database 310 separate from that of the payment key database 312, the contents of the pin-pad database 310 and the payment key database 312 may be combined into a single database. However, it is believed that by maintaining the pin-pad database 310 separate from the payment key database 312, the security of the pin-pad configuration system 100 is enhanced since an unscrupulous entity gaining unauthorized access to, for example, the payment key database 312 and the payment symmetric cryptographic keys payKx would not be able to implement an electronic payment without the merchant identifiers MerchID that become associated with the payment symmetric cryptographic keys payKx by virtue of the methods described herein.

The memory 308 of the computer processing unit 304 also includes non-transient computer processing instructions stored thereon which, when accessed from the memory 308 and executed by the microprocessor 306, implement an operating system (not shown), a merchant enrolment processor 316 and a remote pin-pad configuration processor 318. The operating system controls the overall operation of the terminal activation server 300.

The merchant enrolment processor 316 is configured to receive over a network (the wide area network 110 and/or the mobile communications network 120) from a communications device 200 a merchant activation request that includes a device identifier (e.g. ManfID), and a cryptographically-signed datum. The merchant enrolment processor 316 is configured to verify that the device identifier is uniquely associated with a pin-pad terminal 250 and to confirm from the device identifier and the cryptographically-signed datum that the merchant operator of the communications device 200 is in possession of the pin-pad terminal 250.

The merchant enrolment processor 316 is also configured to authorize the merchant operator for electronic payment with the pin-pad terminal 250 by associating a unique merchant identifier (MerchID) with the device identifier (e.g. ManfID) and by providing to a financial institution the merchant identifier and merchant data received from the merchant operator.

The merchant enrolment processor 316 may provide the communications device 200 with the unique merchant identifier after validating the merchant data, and may confirm from the device identifier and the cryptographically-signed datum (e.g. MPubK-signed MerchID) that the merchant operator of the communications device 200 is in possession of the pin-pad terminal 250 by confirming that the pin-pad terminal 250 generated the cryptographically-signed datum. The operation of the merchant enrolment processor 316 will be discussed in greater detail below.

The remote pin-pad configuration processor 318 is configured to receive a merchant identifier (MerchID) over a network (the wide area network 110 and/or the mobile communications network 120) from a communications device 200 associated with a pin-pad pad terminal 250, and to confirm from the merchant identifier that an entity (merchant) associated with the communications device 200 is authorized to use the pin-pad terminal 250. The remote pin-pad configuration processor 318 is also configured to authenticate the pin-pad terminal 250 from a cryptographically-signed datum (e.g. MPubK-signed manufacturer identifier or MPubK-signed terminal identifier) received from the communications device 200, and to transmit to the pin-pad terminal 250, via the communications device 200, a configuration payload for installation in the pin-pad terminal 250.

The configuration payload includes at least a payment symmetric cryptographic key set (e.g. payKx) that is uniquely associated with the pin-pad terminal 250. The configuration payload may also include the payment processing firmware 270 which, together with the payment symmetric cryptographic keys payKx, allows the pin-pad terminal 250 to perform secure electronic payment transactions (contact (e.g. magnetic strip, EMV (chip/pin)), contactless (e.g. smartcard)) with the financial institution server 500 of the merchant's acquirer (including using the payment symmetric cryptographic keys (payKx) to authenticate to the acquirer's financial institution server 500, and to generate encrypted requests for authorization of said electronic payment transactions). The operation of the remote pin-pad configuration processor 318 will be discussed in greater detail below.

Although the merchant enrolment processor 316 and the remote pin-pad configuration processor 318 are typically implemented as non-transient computer processing instructions, all or a portion of the functionality of the merchant enrolment processor 316 and/or the remote pin-pad configuration processor 318 may be implemented instead in dedicated electronics hardware, such as a field programmable logic gate array (FPGA) or a complex programmable logic device (CPLD).

Financial Institution Server

As discussed, each financial institution server 500 is associated with and administered by a respective financial institution. The financial institution associated with the financial institution server 500 issues payment cards to cardholders (or authorizes a third party to issue the payment cards). Each financial institution server 500 is configured to communicate with other financial institution servers 500 via the payment network, and maintains a secure accounts database that includes a plurality of clusters each uniquely associated with a respective financial account. Each cluster is also uniquely associated with one of the payment cards, and typically identifies the primary account number of the associated payment card, and credit/deposit entries to the associated financial account.

Method of Remotely Authorizing Merchants and Remotely Configuring/Authenticating Pin-Pad Terminals The pin-pad configuration system 100 implements a method of locally installing a manufacturer's configuration (communications firmware 268, unique manufacturer's identifier ManfID, manufacturer public cryptographic key MPubK) in virgin pin-pad terminals.

The pin-pad configuration system 100 also implements a method of remotely authorizing merchants for secure electronic payment with financial institutions. By way of overview, this method involves remotely provisioning merchant card services and payment card acceptance and configuring payment processing host systems through the collection and use of merchant data to perform credit adjudication and other forms of risk management as may be required to confirm the identity and credit risk of a merchant.

Figure 5:
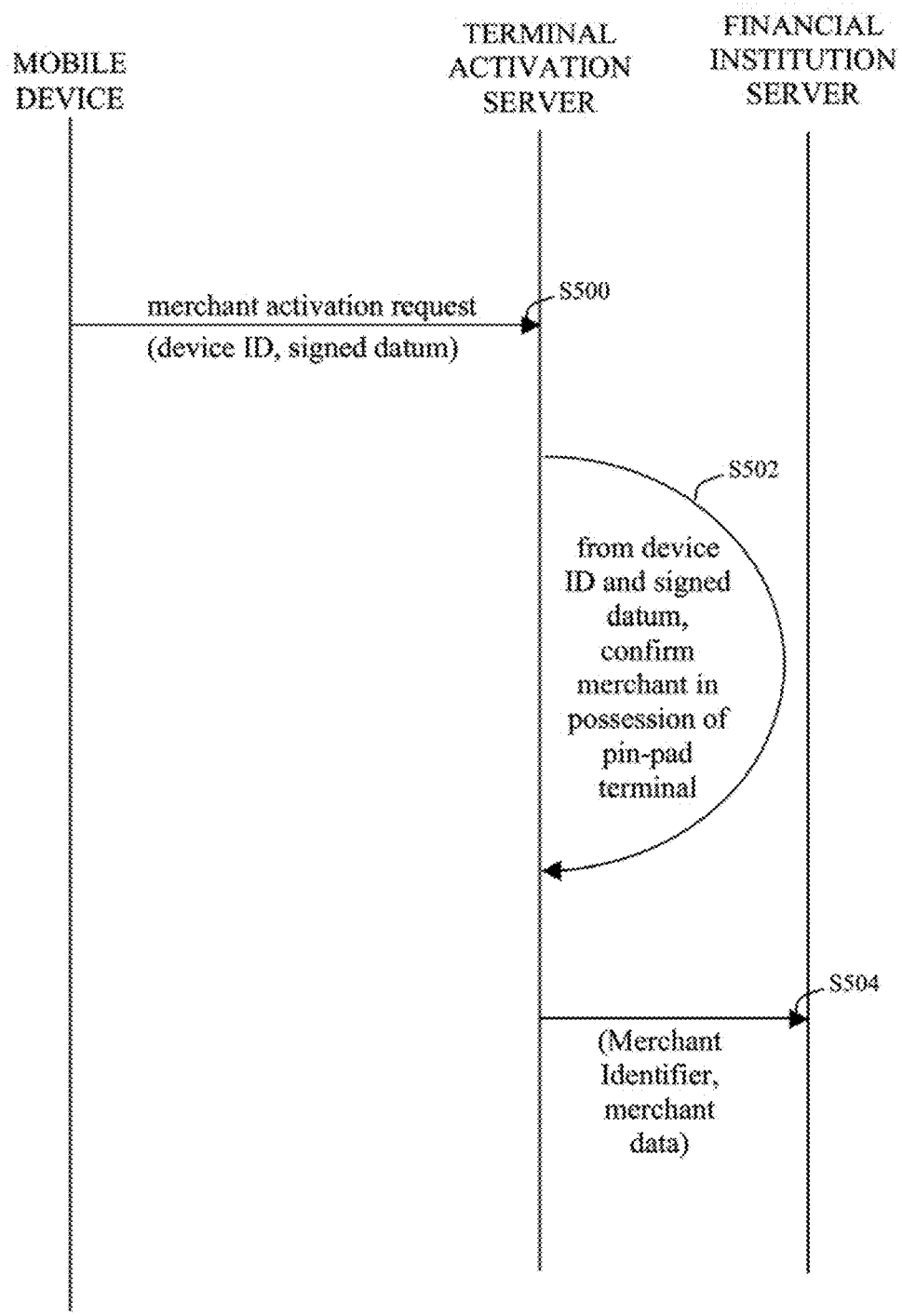
FIG. 5 is a message flow diagram depicting, by way of overview, a method of enrolling a merchant in the pin-pad configuration system.

As shown in FIG. 5, this method involves the terminal activation server 300 receiving, at step S500, over a network (the wide area network 110 and/or the mobile communications network 120), from a communications device 200, a merchant activation request that includes a device identifier (e.g. ManfID) and a cryptographically-signed datum. At step S502, the terminal activation server 300 verifies that the device identifier is uniquely associated with a pin-pad terminal 250, and confirms from the device identifier and the cryptographically-signed datum that the merchant operator of the communications device 200 is in possession of the pin-pad terminal 250.

At step S504, the terminal activation server 300 authorizes the merchant operator for electronic payment with the pin-pad terminal 250 by associating a unique merchant identifier (MerchID) with the device identifier (e.g. ManfID), and by providing to a financial institution the merchant identifier (MerchID) and merchant data received from the merchant operator.

Before (or after) receiving the merchant activation request, the terminal activation server 300 may receive the merchant data via the communications device 200. The terminal activation server 300 may provide the communications device 200 with the unique merchant identifier (e.g. MerchID) after validating the merchant data. The terminal activation server 300 may confirm that the merchant operator of the communications device 200 is in possession of the pin-pad terminal 250 by confirming that the pin-pad terminal 250 generated the cryptographically-signed datum (e.g. MPubK-signed MerchID) from the merchant identifier.

The pin-pad configuration system 100 also implements a method of remotely configuring and authenticating pin-pad terminals 250 through a process by which a chain of trust (i.e. between pin-pad terminal 250, merchant's communications device 200, and pin-pad vendor) is remotely validated by mutual authentication of the pin-pad terminal 250 and the pin-pad vendor's activation server 300.

Figure 6:
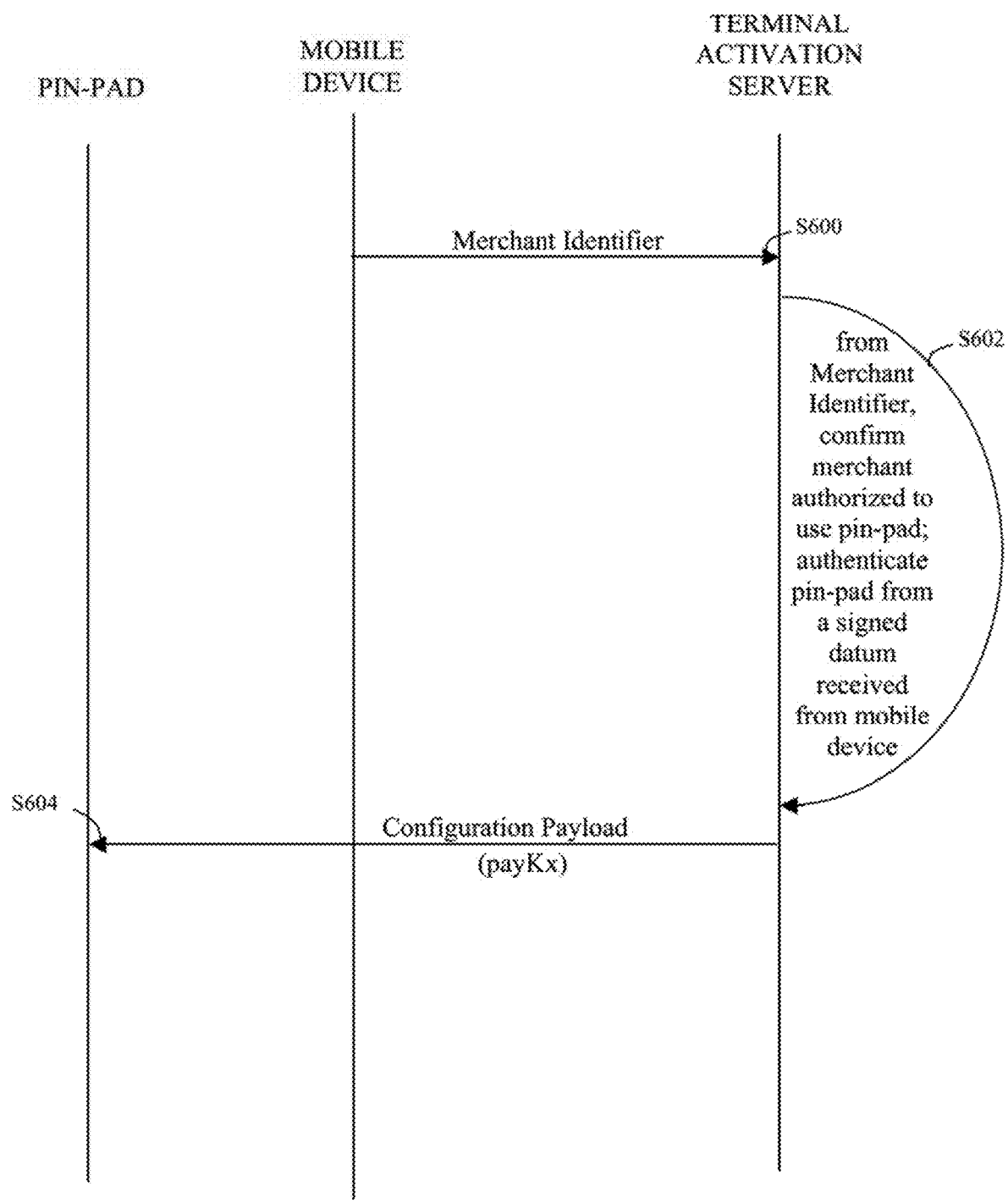
FIG. 6 is a message flow diagram depicting, by way of overview, a method of remotely configuring a pin-pad terminal to effect secure electronic payment.

As shown in FIG. 6, this method involves the terminal activation server 300 receiving, at step S600, a merchant identifier (e.g. MerchID) over a network (the wide area network 110 and/or the mobile communications network 120), from a communications device 200 associated with a pin-pad terminal 250. At step S602, the terminal activation server 300 confirms from the merchant identifier that an entity (merchant) associated with the communications device 200 is authorized to use the pin-pad terminal 250. The terminal activation server 300 may also authenticate the pin-pad terminal 250 from a cryptographically-signed datum received from the communications device 200.

At step S604, the terminal activation server 300 transmits to the pin-pad terminal 250, via the communications device 200, a configuration payload for installation in the pin-pad terminal 250. The configuration payload comprises at least a payment symmetric cryptographic key set (payKx) uniquely associated with the pin-pad terminal 250. The payment symmetric key set configures the pin-pad terminal 250 to effect secure electronic payment via the communications device 200.

A sample embodiment of these methods will now be discussed in detail with reference to FIGS. 7, 8, 9a and 9b.

1. Virgin Pin-Pad Configuration—Local Installation of Communications Firmware and Manufacturer Public Key (MPubK)

Figure 7:
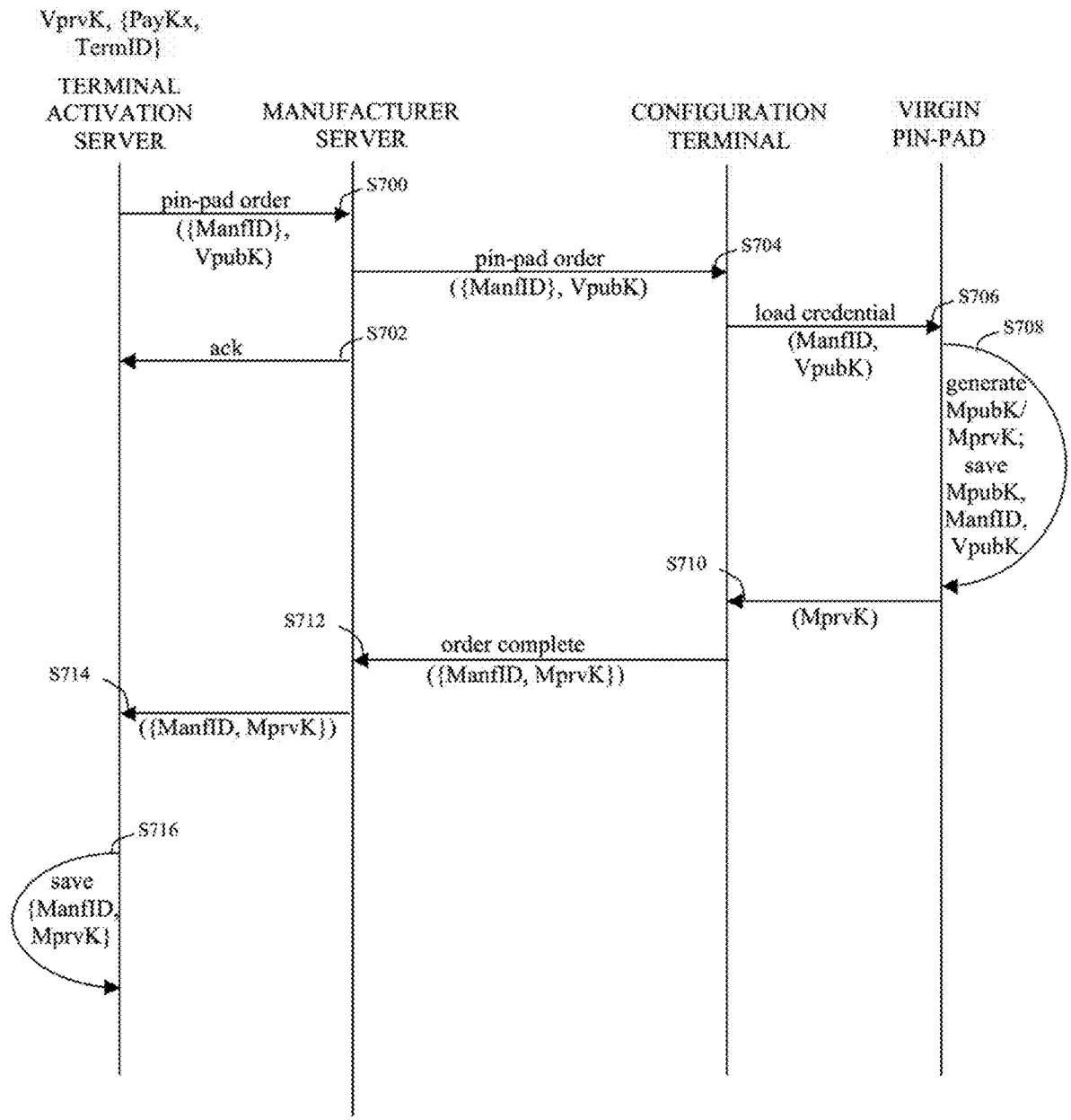
FIG. 7 is a detailed message flow diagram depicting the method of providing virgin pin-pad terminals with a manufacturer's configuration.

Prior to a pin-pad manufacturer releasing pin-pad terminals 250 to a pin-pad vendor, the pin-pad manufacturer executes the virgin pin-pad configuration method, depicted in FIG. 7. The following method configures virgin pin-pad terminals 250 each with communications firmware, a respective manufacturer identifier ManfID and the public cryptographic key MPubK of a set of manufacturer asymmetric cryptographic keys, and provides the pin-pad vendor with the manufacturer identifier ManfID and the associated manufacturer private cryptographic key MPrvK for each of the pin-pad terminals 250. As will be explained, the virgin pin-pad terminal 250 uses its manufacturer identifier ManfID and public cryptographic key MPubK to authenticate to the activation server 500 and to decrypt payment cryptographic keys that are downloaded to the pin-pad terminal 250.

As discussed above, the pin-pad vendor is assigned a vendor public cryptographic key VpubK, and the terminal activation server 300 of the pin-pad vendor is configured with a vendor private cryptographic key VprvK which, together with the vendor's public cryptographic key VpubK, comprises a unique asymmetric encryption key pair. The payment key database 312 maintained by the pin-pad vendor includes a plurality of unique sets of payment symmetric cryptographic keys payKx, and a plurality of unique terminal identifiers TermID each associated with a respective set of the payment symmetric cryptographic keys payKx.

The pin-pad vendor may generate the unique terminal identifiers TermID by, for example, prefixing the output of a pseudo-random number generator or noise generator with a code sequence that is uniquely associated with the pin-pad vendor, and optionally confirming that each TermID is unique within the payment key database 312. The pin-pad vendor may generate the cryptographic keys payKx using any symmetric cryptographic key generation scheme known in the art, including using the current date/time manufacturer as an input to a pseudorandom number generator, and using the generated pseudorandom number as an input to a symmetric cryptographic key generation algorithm. Optionally, the pin-pad vendor may also confirm that each set of payment symmetric cryptographic keys payKx is unique within the payment key database 312.

The pin-pad vendor may provide financial institutions with a payment key payload that lists each unique terminal identifier TermID and identifies the set of unique payment symmetric cryptographic keys payKx that are associated with each terminal identifier TermID. As discussed, a set of payment symmetric cryptographic keys payKx, when installed in a pin-pad terminal 250, allows the pin-pad terminal 250 to perform secure electronic payment transactions with the financial institution server 500 of the merchant's acquirer (including authenticating to the acquirer's financial institution server 500, and generating encrypted requests for authorization of said electronic payment transactions). Accordingly, to comply with the Payment Card Industry Data Security Standard (PCI-DSS), preferably each set of payment symmetric cryptographic keys payKx includes one or more symmetric keys for encrypting sensitive data, one or more symmetric keys for signing messages, and one or more symmetric keys for encrypting/decrypting cryptographic keys.

At step S700 of the pin-pad configuration method, the pin-pad vendor uses its terminal activation server 300 to issue to the pin-pad manufacturer a pin-pad order message ordering one or more pin-pad terminals 250 from the pin-pad manufacturer. The pin-pad manufacturer receives the pin-pad order message via its manufacturer server 400.

The pin-pad order message includes a plurality of unique manufacturer identifiers (e.g. manufacturer serial numbers) ManfID that the pin-pad vendor would like the pin-pad manufacturer to assign to respective pin-pad terminals 250. To allow the pin-pad terminals 250 to authenticate the pin-pad vendor during merchant enrolment (steps S800-S824, discussed below) and to allow the pin-pad manufacturer to authenticate the pin-pad vendor, the pin-pad order message may also include the vendor public cryptographic key VpubK of the pin-pad vendor. The terminal activation server 300 may generate the unique manufacturer identifiers ManfID by, for example, prefixing the output of a pseudo-random number generator or noise generator with a code sequence that is uniquely associated with the pin-pad vendor, and optionally confirming that each ManfID is unique within the pin-pad database 310. To allow the manufacturer server 400 to authenticate the pin-pad vendor, optionally the pin-pad vendor uses its vendor private cryptographic key VprvK to sign the vendor public cryptographic key VpubK, and includes the signed vendor public cryptographic key in the pin-pad order message.

If the pin-pad vendor signed its vendor public cryptographic key VpubK, the manufacturer server 400 may authenticate the pin-pad vendor by using the vendor public cryptographic key VpubK included in the pin-pad order message to validate the signature of the signed vendor public cryptographic key. At step S702, the manufacturer server 400 may provide the terminal activation server 300 with an acknowledgement message acknowledging receipt of the pin-pad order message. The manufacturer server 400 then forwards the pin-pad order message to the pin-pad configuration terminal 450 of the pin-pad manufacturer, at step S704.

To process the pin-pad order, the pin-pad manufacturer interfaces virgin pin-pad terminals 250 with the pin-pad configuration terminal 450, and uses the pin-pad configuration terminal 450 to install the communications firmware 268 into the virgin pin-pad terminals 250. As discussed, the communications firmware 268 allows the pin-pad terminal 250 to process input data received from the keypad 252, display information on the display device 254, to communicate with one of the communications devices 200, and to implement cryptographic (e.g. Data Encryption Standard (DES), triple-DES, Advanced Encryption Standard (AES)) algorithms. However, the communications firmware 268 does not allow the virgin pin-pad terminal 250 to authenticate to any of the financial institution servers 500.

For each pin-pad terminal 250 interfaced with the pin-pad configuration terminal 450, at step S706 the pin-pad configuration terminal 450 issues the pin-pad terminal 250 a load credential message that includes a respective one of the manufacturer identifiers ManfID that was included in the pin-pad order message. As discussed, to allow the pin-pad terminals 250 to authenticate the pin-pad vendor during merchant enrolment (steps S800-S824), the load credential message optionally also includes the (signed) vendor public cryptographic key VpubK.

Each load credential message commands the pin-pad terminal 250 to save in the protected memory 266 thereof the manufacturer identifier ManfID specified in the load credential message, in association with the vendor public cryptographic key VpubK (if provided). The load credential message also commands the pin-pad terminal 250 to generate an asymmetric cryptographic key pair ("manufacturer asymmetric private/public key pair"), and to provide the pin-pad configuration terminal 450 with the manufacturer private cryptographic key MPrvK of the manufacturer asymmetric private/public key pair.

In response, at step S708 the cryptographic algorithm(s) of the communications firmware 268 installed in the pin-pad terminal 250 that is interfaced with the pin-pad configuration terminal 450 generates a manufacturer asymmetric private/public key pair. The communications firmware 268 then generates a load credential response message, and includes the specified manufacturer identifier ManfID and the manufacturer private cryptographic key MPrvK of the manufacturer asymmetric private/public key pair in the load credential response message. At step S708, the pin-pad terminal 250 also saves the manufacturer public cryptographic key MPubK of the manufacturer asymmetric private/public key pair in the protected memory 266 in association with the specified manufacturer identifier ManfID and the (signed) vendor public cryptographic key VpubK (if provided).

The cryptographic algorithms of the pin-pad terminal 250 may generate the manufacturer asymmetric private/public key pair MPrvK/MPubK using any asymmetric cryptographic key generation scheme known in the art, including using the manufacturer identifier ManfID as an input to a pseudorandom number generator, and using the generated pseudorandom number as an input to the cryptographic key generation algorithm. Optionally, to allow the pin-pad vendor to authenticate the pin-pad terminal 250 (at step S716), the pin-pad terminal 250 may use the manufacturer public cryptographic key MPubK to sign the manufacturer private cryptographic key MPrvK, and may include the signed manufacturer private cryptographic key MPrvK in the load credential response message. The pin-pad terminal 250 provides the pin-pad configuration terminal 450 with the load credential response message, at step S710.

The pin-pad configuration terminal 450 repeats steps S704 to S710 until it has received a (signed) manufacturer private cryptographic key MPrvK for each manufacturer identifier ManfID specified in the pin-pad order message, and has configured pin-pad terminals 250 each with a manufacturer public cryptographic key MPubK (corresponding to the associated manufacturer private cryptographic key MPrvK), a respective one of the manufacturer identifiers ManfID specified in the pin-pad order message (i.e. so that each manufacturer identifier ManfID is uniquely associated with a respective pin-pad terminal 250), and optionally the vendor public cryptographic key VpubK.

At step S712, the pin-pad configuration terminal 450 responds to the manufacturer server 400 with an order completion message that lists each manufacturer identifier ManfID specified in the pin-pad order message, and identifies the (signed) manufacturer private cryptographic key MPrvK associated with each manufacturer identifier ManfID. Optionally, the order completion message also identifies the date/time at which the pin-pad configuration terminal 450 received each (signed) manufacturer private cryptographic key MPrvK (i.e. the date/time each (signed) manufacturer private cryptographic key MPrvK was generated).

The pin-pad manufacturer subsequently delivers the requested pin-pad terminals 250 to the pin-pad vendor. Thereafter, at step S714 the pin-pad vendor may use its terminal activation server 300 to establish a secure file transport protocol (FTP) session with the manufacturer server 400. Since the terminal activation server 300 provided the manufacturer server 400 with the vendor public cryptographic key VpubK at step S700, the terminal activation server 300 may use its vendor private cryptographic key VprvK to authenticate to and establish the secure FTP session with the manufacturer server 400.

The terminal activation server 300 then downloads from the manufacturer server 400, via the secure FTP session, a pin-pad credential payload that lists each manufacturer identifier ManfID specified in its pin-pad order message, and identifies the (signed) manufacturer private cryptographic key MPrvK associated with each manufacturer identifier ManfID and optionally the date/time each (signed) manufacturer private cryptographic key MPrvK was generated. Alternately, the terminal activation server 300 may download pin-pad credential payload from the manufacturer server 400, prior to taking delivery of the requested pin-pad terminals 250.

If the pin-pad terminals 250 signed their respective manufacturer private cryptographic keys MPrvK, the terminal activation server 300 may authenticate the pin-pad terminals 250 by using the associated manufacturer public cryptographic keys MPubK included in the pin-pad credential payloads to validate the signatures of the signed manufacturer private cryptographic keys MPrvK. At step S716, the terminal activation server 300 saves the contents of the pin-pad credential payload in the pin-pad database 310.

2. Remote Merchant Enrollment—Pin-Pad Deployment Stage 2

After the pin-pad vendor receives the manufacturer identifiers ManfID and the associated manufacturer private cryptographic keys MPrvK of the requested pin-pad terminals 250, and takes delivery of the associated pin-pad terminals 250, a merchant may purchase a pin-pad terminal 250 from the pin-pad vendor (or a distributor acting on behalf of pin-pad vendor). Thereafter, the pin-pad vendor may execute the merchant enrolment method, depicted in FIG. 8. As discussed, the method remotely (i.e. via the wide area network 110 and/or the mobile communications network 120) remotely provisions merchant card services and payment card acceptance and configures payment processing host systems through the collection of merchant data and the use of the merchant data to perform credit adjudication and other forms of risk management known in the art as may be required to confirm the identity and credit risk of the merchant.

This aspect of the method is implemented by the terminal activation server 300 receiving over a network (e.g. the wide area network 110 and/or the mobile communications network 120) from a communications device 200 a merchant activation request that includes a device identifier (e.g. ManfID) and a cryptographically-signed datum, verifying that the device identifier is uniquely associated with a pin-pad terminal 250, and confirming from the device identifier and the cryptographically-signed datum that the merchant operator is in possession of the pin-pad terminal 250.

The terminal activation server 300 also authorizes the merchant operator for electronic payment with the pin-pad terminal 250 by associating a unique merchant identifier (MerchID) with the device identifier (e.g. ManfID), and by providing to a financial institution the merchant identifier and merchant data received from the merchant operator. The terminal activation server 300 may provide the communications device 200 with the unique merchant identifier after validating the merchant data, and may confirm from the device identifier and the cryptographically-signed datum (e.g. MPubK-signed MerchID) that the merchant operator of the communications device 200 is in possession of the pin-pad terminal 250 by confirming that the pin-pad terminal 250 generated the cryptographically-signed datum from the merchant identifier.

Figure 8:
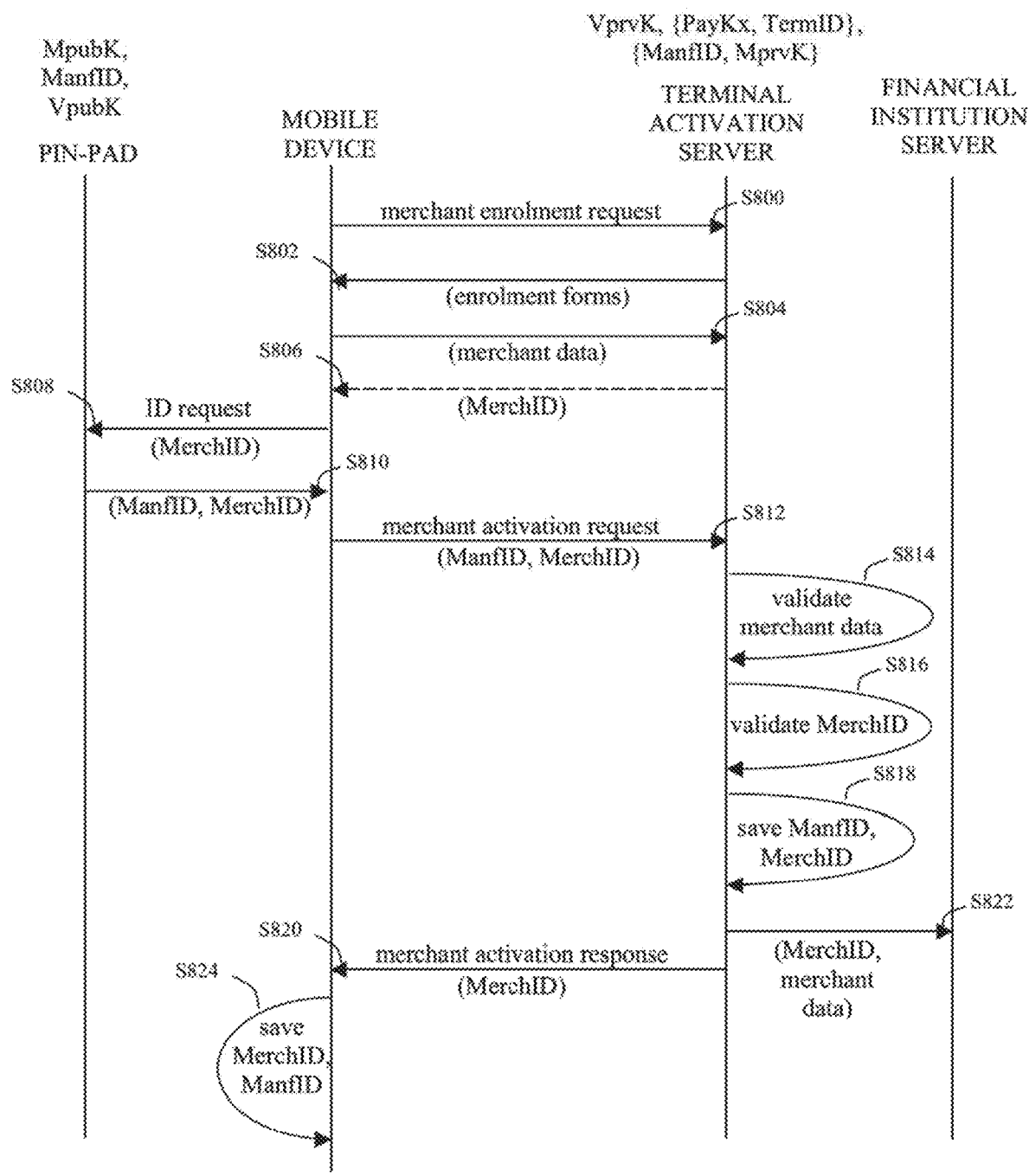
FIG. 8 is a detailed message flow diagram depicting the method of enrolling merchants in the pin-pad configuration system.

The example merchant enrolment method will now be discussed in detail with reference to FIG. 8. At step S800 of the method, the merchant invokes the merchant enrolment procedure 216 on the merchant's communications device 200. The merchant enrolment procedure 216 establishes a secure (encrypted) communications channel with the terminal activation server 300 (e.g. via the wide area network 110 or the mobile communications network 120), generates a merchant enrolment request, and transmits the merchant enrolment request to the terminal activation server 300 via the secure channel.

In response to the merchant enrolment request, at step S802 the merchant enrolment processor 316 of the terminal activation server 300 transmits to the merchant's communications device 200, over the secure communications channel, one or more electronic forms requesting identification information from the merchant. Alternately, the merchant enrolment procedure 216 may be pre-configured with the electronic forms, in which case steps S800 and S802 may be bypassed.

The merchant's communications device 200 displays the electronic forms to the merchant on the display device 202 of the merchant's communications device 200. The merchant then inputs the requested merchant data into the electronic forms via the input device 204 of the merchant's communications device 200. Typically, the merchant data includes the merchant's business name, place of business, contact information (e-mail address, telephone number), bank account information, merchant category and any other information required to confirm that identity of the merchant and to perform a credit status check of the merchant. At step S804, the merchant enrolment procedure 216 may transmit the completed electronic forms, which include the merchant data, to the terminal activation server 300 via the secure channel.

Upon receipt of the merchant data, the merchant enrolment processor 316 may generate a unique merchant identifier MerchID (or retrieve a unique merchant identifier MerchID from a database of pre-generated unique merchant identifiers), and may associate the merchant data with the merchant identifier MerchID. At step S806, the merchant enrolment processor 316 may then transmit the merchant identifier MerchID to the merchant's communications device 200 over the secure communications channel.

The merchant's communications device 200 also establishes a short-range wired or wireless communications channel with the merchant's pin-pad terminal 250. At step S808, the merchant enrolment procedure 216 generates a pin-pad identification request, and transmits the pin-pad identification request to the merchant's pin-pad terminal 250 via the short-range communications channel. If the terminal activation server 300 provided the merchant's communications device 200 with the merchant identifier MerchID at step S806, the merchant enrolment procedure 216 may incorporate the merchant identifier MerchID into the pin-pad identification request.

The merchant's communications device 200 may establish the short-range wired communications channel using a wired connection between the communications device 200 and the pin-pad terminal 250. The merchant's communications device 200 may establish the short-range wireless communications channel by pairing or mutually authenticating with the pin-pad terminal 250 using a short-range wireless communications protocol such as, for example, Bluetooth or WiFi.

Upon receipt of the pin-pad identification request, the merchant's pin-pad terminal 250 retrieves the manufacturer identifier ManfID from its protected memory 266. If the pin-pad identification request included the merchant identifier MerchID, the merchant's pin-pad terminal 250 may sign the merchant identifier MerchID with the manufacturer public cryptographic key MPubK to allow the pin-pad vendor to confirm that the merchant is in actual possession of the pin-pad terminal 250 (at step S816). At step S810, the merchant's pin-pad terminal 250 generates a pin-pad identification response message, incorporates the manufacturer identifier ManfID and optionally the signed merchant identifier MerchID into the pin-pad identification response message, and responds to the pin-pad identification request by transmitting the pin-pad identification response message to the merchant's communications device 200 via the short-range communications channel.

At step S812, the merchant enrolment procedure 216 generates a merchant activation request, incorporates the manufacturer identifier ManfID and optionally the signed merchant identifier MerchID into the merchant activation request, and transmits the merchant activation request to the terminal activation server 300 via the secure channel. Alternately, if the merchant enrolment procedure 216 did not transmit the merchant data to the terminal activation server 300 at step S804 and/or the terminal activation server 300 did not provide the merchant's communications device 200 with the merchant identifier MerchID at step S806, at step S812 the merchant enrolment procedure 216 may incorporate the manufacturer identifier ManfID and the merchant data into the merchant activation request, and transmit the merchant activation request to the terminal activation server 300 via the secure channel.

Upon receipt of the merchant activation request, at step S814 the merchant enrolment processor 316 validates the merchant data (whether received at step S804 or at step S812) using, for example, a third-party identity and/or credit verification service. The merchant enrolment processor 316 also queries the pin-pad database 310 with the manufacturer identifier ManfID to retrieve the manufacturer private cryptographic key MPrvK that is associated with the manufacturer identifier ManfID. Optionally, the merchant enrolment processor 316 uses the date/time information associated with the manufacturer identifier ManfID in the pin-pad database 310 to confirm that the manufacturer private cryptographic key MPrvK has not expired.

If the merchant activation request included the signed merchant identifier MerchID, and the merchant enrolment processor 316 locates the manufacturer private cryptographic key MPrvK that is associated with the manufacturer identifier ManfID in the pin-pad database 310 (and optionally confirms that the manufacturer private cryptographic key MPrvK has not expired), at step S816 the merchant enrolment processor 316 confirms that the merchant is in possession of the pin-pad terminal 250 that is configured with the specified manufacturer identifier ManfID by using the retrieved manufacturer private cryptographic key MPrvK to validate the signed merchant identifier MerchID.

If the merchant enrolment processor 316 confirms that the merchant is in possession of the pin-pad terminal 250 that is configured with the specified manufacturer identifier (if this step is performed), at step S818 the merchant enrolment processor 316 generates a unique merchant identifier MerchID or retrieves a unique merchant identifier MerchID from a database of pre-generated unique merchant identifiers (unless the merchant activation request included the signed merchant identifier MerchID), and associates the merchant with the pin-pad terminal 250 by saving the merchant identifier MerchID in the pin-pad database 310 in association with the unique manufacturer identifier ManfID and the merchant data.

If the outcomes of the merchant identity validation (and optionally the manufacturer private cryptographic key MPrvK expiry check, and the signed merchant identifier MerchID validation check) are all positive, at step S820 the merchant enrolment processor 316 generates a merchant activation response message that includes the merchant identifier MerchID, and responds to the merchant activation request by transmitting the merchant activation response message to the merchant's communications device 200 via the secure channel. At step S822, the merchant enrolment processor 316 may also identify the merchant's financial institution (acquirer) from the bank account information included in the merchant data, and may transmit the merchant identifier MerchID and the merchant category information to the financial institution server 500 that is associated with the merchant's financial institution (merchant's acquirer). The financial institution server 500 of the merchant's acquirer may save the merchant identifier MerchID in a secure database in association with the merchant category information.

Upon receipt of the merchant activation response message, at step S824 the merchant enrolment procedure 216 saves the manufacturer identifier ManfID (received from the terminal activation server 300 at step S810) in the memory 220 in association with the merchant identifier MerchID, to allow the pin-pad vendor to confirm (at the outset of payment key installation (at step S900, discussed below)) that the merchant has been authorized to use this pin-pad terminal 250. The merchant's communications device 200 may also display a message on the display device 202 of the merchant's communications device 200 confirming that the merchant has been authorized to use the specified pin-pad terminal 250.

3. Remote Payment Key Set and Payment Processing Firmware Installation—Pin-Pad Deployment Stage 3

Figure 9A:
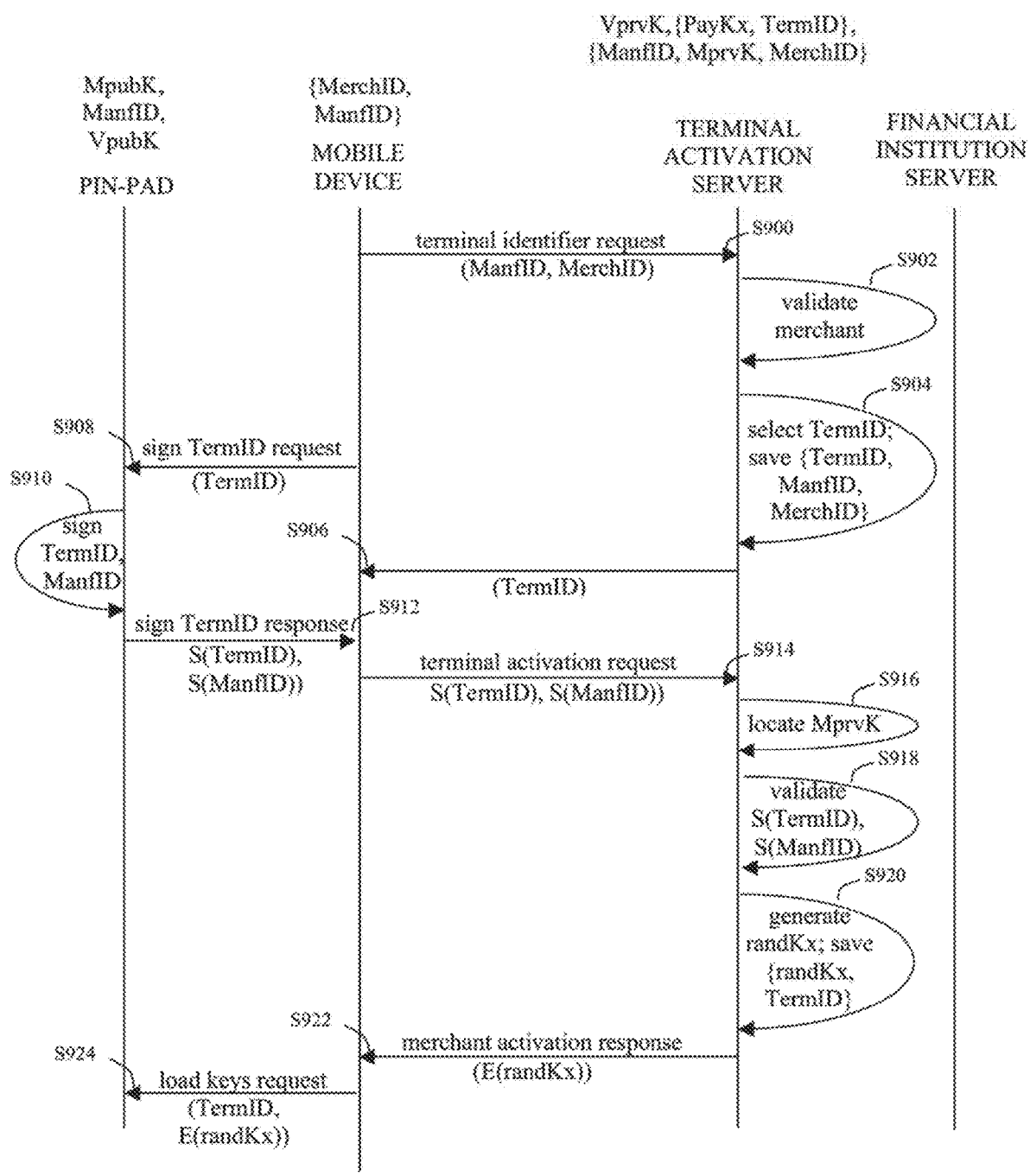
FIGS. 9*a* and 9*b* together comprise a detailed message flow diagram depicting the method of remotely configuring a pin-pad terminal to effect secure electronic payment.
Figure 9B:
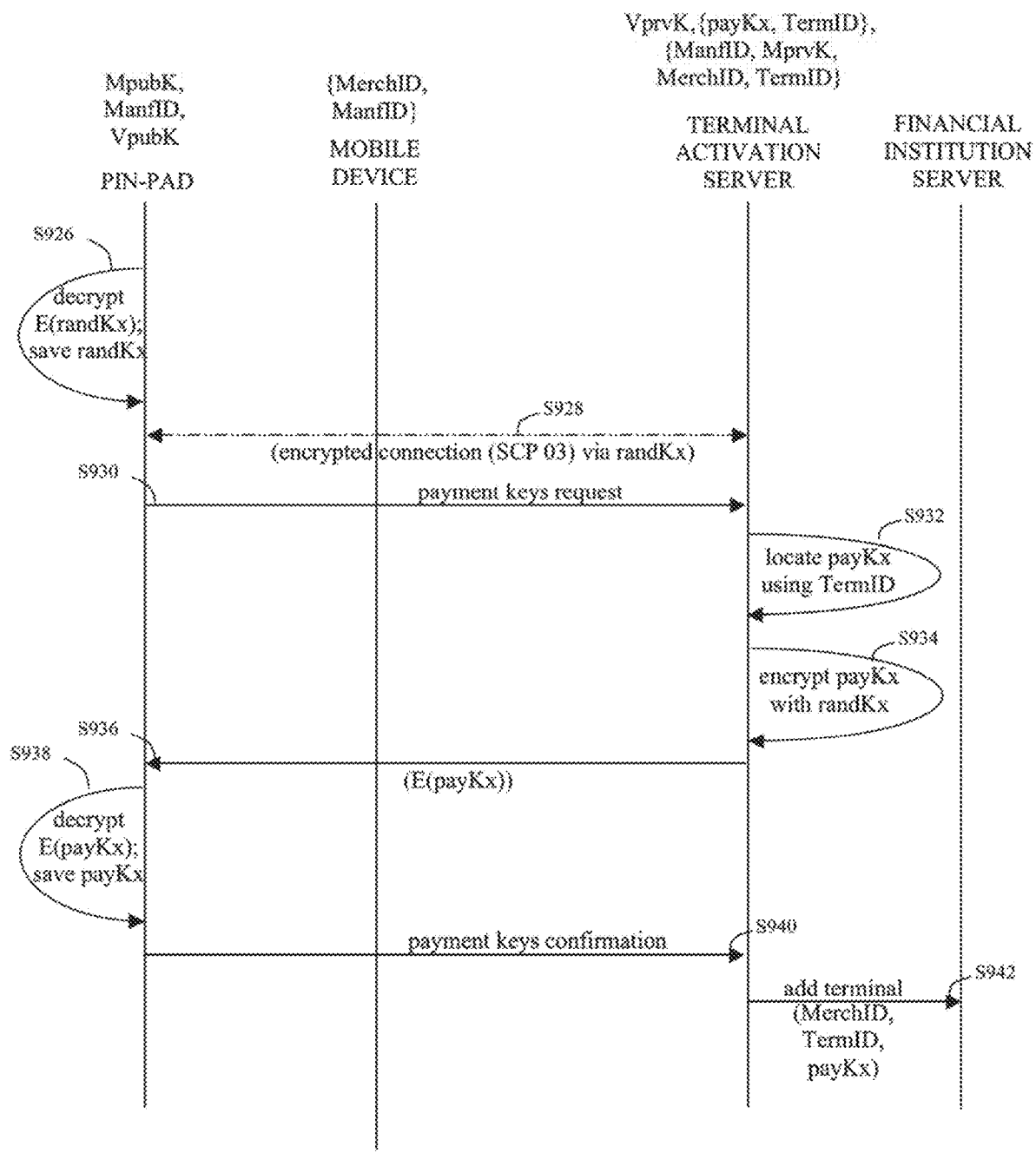

After the pin-pad vendor associates the manufacturer identifier ManfID of the merchant's pin-pad terminal 250 with the merchant identifier MerchID of the merchant in the pin-pad database 310, the merchant may execute the remote pin-pad configuration method, depicted in FIGS. 9a and 9b. As discussed, the method remotely (i.e. via the wide area network 110 and/or the mobile communications network 120) authenticates pin-pad terminals 250 through a process by which a chain of trust (i.e. between pin-pad terminal 250, merchant's communications device 200, and pin-pad vendor) is remotely validated by mutual authentication of the pin-pad terminal 250 and the pin-pad vendor's activation server 300.

This aspect of the method may be implemented by the terminal activation server 300 cryptographically-signing a terminal identifier (e.g. TermID), transmitting the cryptographically-signed terminal identifier (e.g. Vprv-signed TermID) to a communications device 200, and transmitting the configuration payload to the pin-pad terminal 250 only after receiving from the communications device 200 a cryptographically-signed datum (e.g. MPubK-signed TermID) confirming that the pin-pad terminal 250 authenticated the terminal activation server 300 (from the cryptographically-signed terminal identifier) and after authenticating the pin-pad terminal 250 from the cryptographically-signed datum received from the communications device 200.

The method also remotely provisions a virgin pin-pad terminal 250 with any/all cryptographic keys and payment processing firmware required to allow the pin-pad terminal 250 to perform secure electronic payment transactions with the financial institution server 500 of the merchant's acquirer.

This aspect of the method is implemented by the terminal activation server 300 receiving a merchant identifier (e.g. MerchID) over a network from a communications device 250 associated with a pin-pad terminal 250, confirming from the merchant identifier that the entity (e.g. merchant) associated with the communications device 200 is authorized to use the pin-pad terminal 250, authenticating the pin-pad terminal 250 from a cryptographically-signed datum (e.g. MPubK-signed manufacturer identifier or MPubK-signed terminal identifier) received from the communications device 200, and transmitting to the pin-pad terminal 250 via the communications device 200 a configuration payload for installation in the pin-pad terminal 250.

The configuration payload comprises at least a payment symmetric cryptographic key set (e.g. payKx) that is uniquely associated with the pin-pad terminal 250. The configuration payload may also include the payment processing firmware 270 which, together with the payment symmetric cryptographic keys payKx, allows the pin-pad terminal 250 to perform secure electronic payment transactions (contact (e.g. magnetic strip, EMV (chip/pin)), contactless (e.g. smartcard)) with the financial institution server 500 of the merchant's acquirer (including using the payment symmetric cryptographic keys (payKx) to authenticate to the acquirer's financial institution server 500, and to generate encrypted requests for authorization of said electronic payment transactions).

The example remote pin-pad configuration method will now be discussed in detail with reference to FIGS. 9a and 9b. At step S900 of the method, the merchant invokes the pin-pad configuration procedure 218 on the merchant's communications device 200. The pin-pad configuration procedure 218 establishes a secure (encrypted) communications channel with the terminal activation server 300 (e.g. via the wide area network 110 or the mobile communications network 120), generates a terminal identifier request, incorporates the manufacturer identifier ManfID and the merchant identifier MerchID (both saved in the memory 220 at step S824) into the terminal identifier request, and transmits the terminal identifier request to the terminal activation server 300 via the secure channel.

Upon receipt of the terminal identifier request, at step S902 the remote pin-pad configuration processor 318 of the terminal activation server 300 confirms that the merchant has been authorized to use the specified pin-pad terminal 250 by querying the pin-pad database 310 with the merchant identifier MerchID to retrieve the associated manufacturer identifier ManfID (both saved in the pin-pad database 310 at step S818), and compares the retrieved manufacturer identifier ManfID with the manufacturer identifier included in the terminal identifier request. Optionally, the remote pin-pad configuration processor 318 uses the date/time information associated with the manufacturer identifier in the pin-pad database 310 to confirm that the manufacturer private cryptographic key MPrvK has still not expired.

If the remote pin-pad configuration processor 318 confirms that the merchant has been authorized to use the specified pin-pad terminal 250 (and optionally confirms that the manufacturer private cryptographic key MPrvK has not expired), at step S904 the remote pin-pad configuration processor 318 selects from the payment key database 312 one of the terminal identifiers TermID that is not yet associated with any merchant identifier MerchID in the pin-pad database 310, and saves the selected terminal identifier TermID in the pin-pad database 310 in association with the merchant identifier MerchID and the manufacturer identifier ManfID. To allow the pin-pad terminal 250 to subsequently authenticate the terminal activation server 300 (at step S910), the remote pin-pad configuration processor 318 may sign the selected terminal identifier TermID with the vendor private cryptographic key VprvK of the pin-pad vendor. The remote pin-pad configuration processor 318 then responds to the terminal identifier request, at step S906, by transmitting the (signed) terminal identifier TermID to the merchant's communications device 200 over the secure communications channel.

The merchant's communications device 200 also establishes a short-range wired or wireless communications channel with the merchant's pin-pad terminal 250. At step S908, the pin-pad configuration procedure 218 generates a sign terminal identifier request that includes the (signed) terminal identifier TermID, and transmits the sign terminal identifier request to the merchant's pin-pad terminal 250 via the short-range communications channel.

The merchant's communications device 200 may establish the short-range wired communications channel using a wired connection between the communications device 200 and the pin-pad terminal 250. The merchant's communications device 200 may establish the short-range wireless communications channel by pairing or mutually authenticating with the pin-pad terminal 250 using a short-range wireless communications protocol such as, for example, Bluetooth or WiFi.

Upon receipt of the sign terminal identifier request, the merchant's pin-pad terminal 250 validates the signature of the signed terminal identifier TermID (if signed) using the vendor public cryptographic key VpubK saved in the protected memory 266 thereof. If the pin-pad terminal 250 successfully authenticated the terminal activation server 300 (i.e. the signature of the signed terminal identifier TermID is validated), at step S910 the merchant's pin-pad terminal 250 signs the terminal identifier TermID and the manufacturer identifier ManfID with the manufacturer public cryptographic key MPubK saved in the protected memory 266 thereof, to thereby allow the terminal activation server 300 to subsequently authenticate the pin-pad terminal 250 (at step S916). The merchant's pin-pad terminal 250 then responds to the sign terminal identifier request, at step S912, by generating a sign terminal identifier response message, incorporating the MPubK-signed terminal identifier S(TermID) and the MPubK-signed manufacturer identifier S(ManfID) into the sign terminal identifier response message, and responds to the sign terminal identifier request by transmitting the sign terminal identifier response message to the merchant's communications device 200 via the short-range communications channel.

At step S914, the pin-pad configuration procedure 218 generates a terminal activation request, incorporates the MPubK-signed terminal identifier S(TermID) and the MPubK-signed manufacturer identifier S(ManfID) into the terminal activation request, and transmits the terminal activation request to the terminal activation server 300 via the secure channel.

Upon receipt of the terminal activation request, at step S916 the remote pin-pad configuration processor 318 queries the pin-pad database 310 with the manufacturer identifier ManfID to retrieve the manufacturer private cryptographic key MPrvK associated with the manufacturer identifier ManfID. Optionally, the terminal activation server 300 uses the date/time information associated with the manufacturer identifier ManfID in the pin-pad database 310 to confirm that the manufacturer private cryptographic key MPrvK has not expired.

If the remote pin-pad configuration processor 318 locates the manufacturer private cryptographic key MPrvK that is associated with the manufacturer identifier ManfID in the pin-pad database 310 (and optionally confirms that the manufacturer private cryptographic key MPrvK has not expired), at step S918 the remote pin-pad configuration processor 318 authenticates the pin-pad terminal 250 by using the retrieved manufacturer private cryptographic key MPrvK to validate the MPubK-signed terminal identifier S(TermID) and/or the MPubK-signed manufacturer identifier (SManfID).

If the remote pin-pad configuration processor 318 authenticated the pin-pad terminal 250 at step S918 using the manufacturer private cryptographic key MPrvK (and the pin-pad terminal 250 authenticated the terminal activation server 300 at step S910 using the vendor public cryptographic key VpubK), the pin-pad terminal 250 and the terminal activation server 300 will therefore have mutually authenticated each other by the completion of step S918. Accordingly, if the pin-pad terminal 250 and the terminal activation server 300 successfully mutually authenticate each other, at step S920 the remote pin-pad configuration processor 318 generates a set of random symmetric cryptographic keys randKx, and temporarily saves the random symmetric cryptographic keys randKx in the payment key database 312 in association with the terminal identifier TermID (and the associated set of payment symmetric cryptographic keys payKx). The remote pin-pad configuration processor 318 also encrypts the set of random symmetric cryptographic keys randKx with the manufacturer private cryptographic key MPrvK. Preferably, the set of random symmetric cryptographic keys randKx includes one or more symmetric keys for encrypting sensitive data, one or more symmetric keys for signing messages, and one or more symmetric keys for encrypting/decrypting cryptographic keys.

The remote pin-pad configuration processor 318 responds to the terminal activation request, at step S922, by transmitting the encrypted random symmetric cryptographic keys E(randKx) to the merchant's communications device 200 over the secure communications channel. At step S924, the pin-pad configuration procedure 218 generates a load pin-pad keys request, incorporates the encrypted random symmetric cryptographic keys E(randKx) and optionally the terminal identifier TermID into the load pin-pad keys request, and transmits the load pin-pad keys request to the merchant's pin-pad terminal 250 via the short-range communications channel.

Upon receipt of the load pin-pad keys request, the merchant's pin-pad terminal 250 decrypts the encrypted random symmetric cryptographic keys with the manufacturer public cryptographic key MPubK saved in the protected memory 266, and saves the terminal identifier TermID (received at step S908 and/or S924) and the decrypted random symmetric cryptographic keys randKx in the protected memory 266, at step S926.

At step S928, the merchant's pin-pad terminal 250 uses the random symmetric cryptographic keys randKx and the terminal identifier TermID to establish a communications tunnel that is encrypted end-to-end between the pin-pad terminal 250 and the terminal activation server 300 via the merchant's communications device 200, and is carried within the short-range communications channel that is established between the merchant's pin-pad terminal 250 and the merchant's communications device 200, and within the secure channel that is established between the merchant's communications device 200 and the terminal activation server 300. The encrypted communications tunnel may be a GlobalPlatform Secure Channel Protocol (SCP) 03 session.

At step S930, the merchant's pin-pad terminal 250 generates a payment keys request, and transmits the payment keys request to the terminal activation server 300 through the encrypted communications tunnel. In response, at step S932, the remote pin-pad configuration processor 318 retrieves from the payment key database 312 the set of payment symmetric cryptographic keys payKx that are associated with the terminal identifier TermID and the random symmetric cryptographic keys randKx that were used to establish the encrypted communications tunnel. The remote pin-pad configuration processor 318 encrypts the payment symmetric cryptographic keys payKx and a copy of the payment processing firmware 270 with the random symmetric cryptographic keys randKx, and responds to the payment keys request, at step S936, by transmitting the encrypted payment symmetric cryptographic keys E(payKx)

and the encrypted firmware 270 to the merchant's pin-pad terminal 250 through the encrypted communications tunnel.

The pin-pad configuration procedure 218 decrypts the encrypted payment symmetric cryptographic keys payKx and the encrypted payment processing firmware 270 with the random symmetric cryptographic keys randKx saved in the protected memory 266, and saves the decrypted payment symmetric cryptographic keys payKx and the payment processing firmware 270 in the protected memory 266, at step S938. At step S940, the pin-pad terminal 250 generates a payment keys confirmation message confirming installation of the payment symmetric cryptographic keys payKx and the payment processing firmware 270, and transmits the payment keys confirmation message to the terminal activation server 300 through the encrypted communications tunnel.

In response to the payment keys confirmation message, at step S942 the remote pin-pad configuration processor 318 may expunge the random symmetric cryptographic keys randKx from the payment key database 312, and identifies the merchant's financial institution from the bank account information included in the merchant data (saved in the pin-pad database 310 in association with the merchant identifier MerchID and the manufacturer identifier ManfID).

The remote pin-pad configuration processor 318 also generates an add terminal message that includes the merchant identifier MerchID, and the terminal identifier TermID, and may also include the payment symmetric cryptographic keys payKx unless the pin-pad vendor already provided the financial institution with a payment key payload listing each unique terminal identifier Term ID and the associated set of unique payment symmetric cryptographic keys payKx, as discussed above. The remote pin-pad configuration processor 318 then transmits the add terminal message to the financial institution server 500 that is associated with the merchant's financial institution (merchant's acquirer). The financial institution server 500 saves the merchant identifier MerchID in a secure database in association with the terminal identifier TermID and the associated payment symmetric cryptographic keys payKx.

Thereafter, the payment processing firmware 270 can use the payment symmetric cryptographic keys payKx to perform secure electronic payment transactions (contact (e.g. magnetic strip, EMV (chip/pin)), contactless (e.g. smartcard)) with the financial institution server 500 of the merchant's acquirer (including using the payment symmetric cryptographic keys (payKx) to authenticate to the acquirer's financial institution server 500, and to generate encrypted requests for authorization of said electronic payment transactions).

Preferably, the pin-pad terminal 250 establishes an encrypted communications tunnel with the financial institution server 500, via the merchant's communications device 200, to initiate the electronic payment transactions. As above, the encrypted communications tunnel may be a GlobalPlatform Secure Channel Protocol (SCP) 03 session.

The invention claimed is:

1. A terminal configuration server comprising:
a memory storing a terminal database and further storing processing instructions; and
a processor in communication with the memory, wherein the processing instructions when executed by the processor cause the processor to:
save a manufacturer identifier in the terminal database in association with a merchant identifier, wherein the manufacturer identifier identifies a terminal;
transmit the merchant identifier to a communications device via a communications network;
receive a terminal identifier request from the communications device via the communications network, the terminal identifier request including the manufacturer identifier and the merchant identifier;
verify that the manufacturer identifier included in the terminal identifier request is associated with the merchant identifier in the terminal database; and
after the verifying, download a payload to the terminal via the communications device.

2. The terminal configuration server according to claim 1, wherein the payload is stored in a payload database, and the processing instructions further cause the processor to download the payload by:
providing the communications device with a terminal identifier;
receiving a terminal activation request from the communications device via the communications network, the terminal activation request including the terminal identifier and the manufacturer identifier;
validating the terminal activation request from a first terminal cryptographic key associated with the manufacturer identifier in the terminal database;
locating the payload associated with the terminal identifier in the payload database; and
after the validating the terminal activation request, providing the terminal with the located payload via the communications device.

3. The terminal configuration server according to claim 2, wherein the processing instructions further cause the processor to download the payload by saving the terminal identifier in the terminal database in association with the manufacturer identifier and the first terminal cryptographic key; and
the processing instructions cause the processor to validate the terminal activation request by:
(i) locating the first terminal cryptographic key associated with the terminal identifier in the terminal database; and
(ii) confirming, using the located first terminal cryptographic key, that the terminal identifier included in the terminal activation request was signed with a second terminal cryptographic key, wherein the located first terminal cryptographic key and the second terminal cryptographic key are an asymmetric cryptographic key pair.

4. The terminal configuration server according to claim 3, wherein the processing instructions further cause the processor to provide the located payload by:
generating a cryptographic key set;
encrypting the cryptographic key set with the located first terminal cryptographic key, and transmitting the encrypted cryptographic key set to the terminal via the communications device;
establishing an encrypted tunnel with the terminal configuration terminal using the cryptographic key set, the encrypted tunnel being encrypted end-to-end between the server and the terminal; and
transmitting the located payload to the terminal via the encrypted tunnel.

5. The terminal configuration server according to claim 3, wherein the processing instructions further cause the processor to:
receive the merchant identifier and the manufacturer identifier from the communications device;

locate the first terminal cryptographic key associated with the manufacturer identifier in the terminal database; and confirm, using the located first terminal cryptographic key, that the merchant identifier was signed with the second terminal cryptographic key.

6. The terminal configuration server according to claim 5, wherein the processing instructions cause the processor to receive the merchant identifier and the manufacturer identifier by:

(i) receiving the first terminal cryptographic key from the communications device; and (ii) receiving the merchant identifier and the manufacturer identifier after receiving the first terminal cryptographic key.

7. A method of remotely configuring a terminal using a computer server, the computer server being in communication with a terminal database, the method comprising:

the computer server saving a manufacturer identifier in the terminal database in association with a merchant identifier;

the computer server transmitting the merchant identifier to a communications device via a communications network, wherein the manufacturer identifier identifies a terminal;

the computer server receiving a terminal identifier request from the communications device via the communications network, the terminal identifier request including the manufacturer identifier and the merchant identifier;

the computer server verifying that the manufacturer identifier included in the terminal identifier request is associated with the merchant identifier in the terminal database; and after the verifying, the computer server downloading a payload to the terminal via the communications device.

8. The method according to claim 7, wherein the payload is stored in a payload database, and the downloading a payload comprises:

the computer server providing the communications device with a terminal identifier;

the computer server receiving a terminal activation request from the communications device via the communications network, the terminal activation request including the terminal identifier and the manufacturer identifier;

the computer server validating the terminal activation request from a first terminal cryptographic key associated with the manufacturer identifier in the terminal database;

the computer server locating the payload associated with the terminal identifier in the payload database; and after the validating the terminal activation request, the computer server providing the terminal with the located payload via the communications device.

9. The method according to claim 8, wherein the downloading a payload further comprises the computer server saving the terminal identifier in the terminal database in association with the manufacturer identifier and the first terminal cryptographic key; and the validating the terminal activation request comprises the computer server:

(i) locating the first terminal cryptographic key associated with the terminal identifier in the terminal database; and (ii) confirming, using the located first terminal cryptographic key, that the terminal identifier included in the terminal activation request was signed with a second terminal cryptographic key, wherein the located first terminal cryptographic key and the second terminal cryptographic key are an asymmetric cryptographic key pair.

10. The method according to claim 9, wherein the providing the located payload comprises:

the computer server generating a cryptographic key set;

the computer server encrypting the cryptographic key set with the located first terminal cryptographic key, and transmitting the encrypted cryptographic key set to the terminal via the communications device;

the computer server establishing an encrypted tunnel with the terminal using the cryptographic key set, the encrypted tunnel being encrypted end-to-end between the computer server and the terminal; and the computer server transmitting the located payload to the terminal via the encrypted tunnel.

11. The method according to claim 9, further comprising:

the computer server receiving the merchant identifier and the manufacturer identifier from the communications device;

the computer server locating the first terminal cryptographic key associated with the manufacturer identifier in the terminal database; and the computer server confirming, using the located first terminal cryptographic key, that the merchant identifier was signed with the second terminal cryptographic key.

12. The method according to claim 11, wherein the receiving the merchant identifier and the manufacturer identifier comprises the computer server:

(i) receiving the first terminal cryptographic key from the communications device; and (ii) receiving the merchant identifier and the manufacturer identifier after receiving the first terminal cryptographic key.

13. A non-transient computer-readable medium storing a terminal database and further storing processing instructions which when executed by a processing unit of a computer, cause the processing unit to:

save a manufacturer identifier in the terminal database in association with a merchant identifier, wherein the manufacturer identifier identifies a terminal;

transmit the merchant identifier to a communications device via a communications network;

receive a terminal identifier request from the communications device via the communications network, the terminal identifier request including the manufacturer identifier and the merchant identifier;

verify that the manufacturer identifier included in the terminal identifier request is associated with the merchant identifier in the terminal database; and after the verifying, download a payload to the terminal via the communications device.

14. The computer-readable medium according to claim 13, wherein the payload is stored in a payload database, and the processing instructions further cause the processing unit to download the payload by:

providing the communications device with a terminal identifier;

receiving a terminal activation request from the communications device via the communications network, the terminal activation request including the terminal identifier and the manufacturer identifier;

validating the terminal activation request from a first terminal cryptographic key associated with the manufacturer identifier in the terminal database;

locating the payload associated with the terminal identifier in the payload database; and after the validating the terminal activation request, providing the terminal with the located payload via the communications device.

15. The computer-readable medium according to claim 14, wherein the processing instructions further cause the processing unit to download the payload by saving the terminal identifier in the terminal database in association with the manufacturer identifier and the first terminal cryptographic key; and the processing instructions cause the processing unit to validate the terminal activation request by:
(i) locating the first terminal cryptographic key associated with the terminal identifier in the terminal database; and
(ii) confirming, using the located first terminal cryptographic key, that the terminal identifier included in the terminal activation request was signed with a second terminal cryptographic key, wherein the located first terminal cryptographic key and the second terminal cryptographic key are an asymmetric cryptographic key pair.

16. The computer-readable medium according to claim 15, wherein the processing instructions further cause the processing unit to provide the located payload by:
generating a cryptographic key set;
encrypting the cryptographic key set with the located first terminal cryptographic key, and transmitting the encrypted cryptographic key set to the terminal via the communications device;

establishing an encrypted tunnel with the terminal using the cryptographic key set, the encrypted tunnel being encrypted end-to-end between the computer server and the terminal; and transmitting the located payload to the terminal via the encrypted tunnel.

17. The computer-readable medium according to claim 15, wherein the processing instructions further cause the processing unit to:

receive the merchant identifier and the manufacturer identifier from the communications device;

locate the first terminal cryptographic key associated with the manufacturer identifier in the terminal database; and confirm, using the located first terminal cryptographic key, that the merchant identifier was signed with the second terminal cryptographic key.

18. The computer-readable medium according to claim 17, wherein the processing instructions cause the processing unit to receive the merchant identifier and the manufacturer identifier by:

(i) receiving the first terminal cryptographic key from the communications device; and (ii) receiving the merchant identifier and the manufacturer identifier after receiving the first terminal cryptographic key.

* * * * *